United States Patent
Horita

(10) Patent No.: US 12,209,972 B2
(45) Date of Patent: Jan. 28, 2025

(54) INSPECTION SUPPORT DEVICE, INSPECTION SUPPORT METHOD, AND INSPECTION SUPPORT PROGRAM

(71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 163 days.

(21) Appl. No.: 17/932,076

(22) Filed: Sep. 14, 2022

(65) Prior Publication Data

US 2023/0003663 A1 Jan. 5, 2023

Related U.S. Application Data

(63) Continuation of application No. PCT/JP2021/007649, filed on Mar. 1, 2021.

(30) Foreign Application Priority Data

Mar. 31, 2020 (JP) ................................ 2020-064083

(51) Int. Cl.
*G01N 21/88* (2006.01)
*G06T 7/00* (2017.01)
(Continued)

(52) U.S. Cl.
CPC ....... *G01N 21/8851* (2013.01); *G06T 7/0002* (2013.01); *G06V 10/25* (2022.01);
(Continued)

(58) Field of Classification Search
CPC ........ G01N 21/8851; G01N 2021/8854; G06T 7/0002; G06T 2207/10024;
(Continued)

(56) References Cited

U.S. PATENT DOCUMENTS 9,778,206 B2 * 10/2017 Honda ................ G01N 21/956
10,416,088 B2 * 9/2019 Duffy ...................... H01J 37/26
(Continued)

FOREIGN PATENT DOCUMENTS

| CN | 108122801 A | 6/2018 |
| CN | 109477800 A | 3/2019 |

(Continued)

OTHER PUBLICATIONS

International Search Report issued in PCT/JP2021/007649; mailed May 18, 2021.
(Continued)

*Primary Examiner* — Hung V Nguyen
(74) *Attorney, Agent, or Firm* — Studebaker & Brackett PC

(57) ABSTRACT

A processor of the inspection support device acquires an image obtained by imaging a structure to be inspected and detects damage to the structure on the basis of the acquired image. In a case where two or more types of damage (cracking B and linear free lime $C_2$) to the structure are detected, the processor determines whether or not two or more types of damage are detected from the same or adjacent positions. In a case where determination is made that the cracking B and the linear free lime $C_2$ are detected from the same or adjacent positions when the processor outputs the damage detection result (a damage image, a damage diagram, and the like), the processor preferentially outputs a damage detection result of the linear free lime $C_2$ in accordance with a priority of a damage type.

20 Claims, 25 Drawing Sheets

(51) Int. Cl.
*G06V 10/25* (2022.01)
*G06V 10/74* (2022.01)
*G06V 10/764* (2022.01)

(52) U.S. Cl.
CPC .......... *G06V 10/761* (2022.01); *G06V 10/764* (2022.01); *G01N 2021/8854* (2013.01); *G06T 2207/10024* (2013.01); *G06T 2207/20081* (2013.01)

(58) Field of Classification Search
CPC .......... G06T 2207/20081; G06V 10/25; G06V 10/761; G06V 10/764
See application file for complete search history.

(56) References Cited

U.S. PATENT DOCUMENTS

| | | | | |
|---|---|---|---|---|
| 10,871,451 | B2* | 12/2020 | Shabtay | G01N 21/8803 |
| 10,885,618 | B2* | 1/2021 | Hanzawa | G06V 10/7784 |
| 11,105,749 | B2 | 8/2021 | Nogami et al. | |
| 2013/0329039 | A1* | 12/2013 | Sakai | G06T 7/41 |
| | | | | 348/126 |
| 2018/0189941 | A1 | 7/2018 | Yamagishi | |
| 2018/0308230 | A1 | 10/2018 | Karube | |
| 2019/0237296 | A1 | 8/2019 | Otani et al. | |
| 2020/0175352 | A1 | 6/2020 | Cha et al. | |
| 2023/0003663 | A1 | 1/2023 | Horita | |

FOREIGN PATENT DOCUMENTS

| | | | |
|---|---|---|---|
| EP | 3410102 | A1 | 12/2018 |
| JP | 2002-185857 | A | 6/2002 |
| JP | 2002-188998 | A | 7/2002 |
| JP | 2006-112127 | A | 4/2006 |
| JP | 2006-170871 | A | 6/2006 |
| JP | 4515628 | B2 | 8/2010 |
| JP | 2019-132637 | A | 8/2019 |
| WO | 2017/056930 | A1 | 4/2017 |
| WO | 2017/130699 | A1 | 8/2017 |
| WO | 2018/165753 | A1 | 9/2018 |
| WO | 2021/199830 | A1 | 10/2021 |

OTHER PUBLICATIONS

International Preliminary Report On Patentability (Chapter I) and Written Opinion of the International Searching Authority issued in PCT/JP2021/007649; issued Sep. 29, 2022.
Hüthwohl Philipp et al., "Multi-classifier for reinforced concrete bridge defects", Automation in Construction, vol. 105, pp. 102824 (1-15), Apr. 21, 2019, Elsevier.
Spencer Billie F. et al., "Advances in Computer Vision-Based Civil Infrastructure Inspection and Monitoring", Engineering, vol. 5, No. 2, pp. 199-222, Apr. 1, 2019, Elsevier.
Mundt Martin et al., "Meta-learning Convolutional Neural Architectures for Multi-target Concrete Defect Classification with the COncrete DEfect BRidge IMage Dataset", 2019 IEEE/CVF Conference on Computer Vision and Pattern Recognition (CVPR), Jun. 15, 2019, pp. 11188-11197, IEEE.
Arun Mohan et al., "Crack detection using image processing: A critical review and analysis", Alexandria Engineering Journal: AEJ, vol. 57, No. 2, pp. 787-798, Jun. 1, 2018, Elsevier.
The extended European search report issued by the European Patent Office on May 15, 2023, which corresponds to European Patent Application No. 21781590.1-1210 and is related to U.S. Appl. No. 17/932,076.
An Office Action; "Notice of Reasons for Refusal," mailed by the Japanese Patent Office on Jun. 24, 2024, which corresponds to Japanese Patent Application No. 2023-172856 and is related to U.S. Appl. No. 17/932,076; with English language translation.
An Office Action; mailed by the China National Intellectual Property Administration of the People's Republic of China on Sep. 15, 2024, which corresponds to Chinese Patent Application No. 202180022542.7 and is related to U.S. Appl. No. 17/932,076.

* cited by examiner

[ ORTHOIMAGE ]

[ ORTHOIMAGE + DAMAGE DIAGRAM ]

[ DAMAGE DIAGRAM ]

| DAMAGE ID | DAMAGE TYPE | SIZE (WIDTH mm) | SIZE (LENGTH mm) | SIZE (AREA $m^2$) |
|---|---|---|---|---|
| C1 | CRACKING | 0.55 | 1800 | - |
| C2 | CRACKING | 0.60 | 700 | - |
| C3 | CRACKING | 0.30 | 2000 | - |
| C4 | CRACKING | 0.25 | 1000 | - |
| C5 | CRACKING | 0.10 | 1500 | - |
| H1 | PEELING | - | - | 0.85 |

[ DAMAGE QUANTITY TABLE ]

PRIORITY
[1] FREE LIME (PLANAR)
[2] FREE LIME (LINEAR)

PRIORITY
[1] LINEAR FREE LIME
[2] PLANAR FREE LIME

PRIORITY
[1] RUST JUICE
[2] FREE LIME
[3] WATER LEAKAGE

PRIORITY
[1] WATER LEAKAGE
[2] FREE LIME
[3] RUST JUICE

TRANSPARENCY: 10

TRANSPARENCY: 50

TRANSPARENCY: 100

INSPECTION SUPPORT DEVICE, INSPECTION SUPPORT METHOD, AND INSPECTION SUPPORT PROGRAM

CROSS-REFERENCE TO RELATED APPLICATIONS

This application is a Continuation of PCT International Application No. PCT/JP2021/007649 filed on Mar. 1, 2021, which claims priority under 35 U.S.C. § 119(a) to Japanese Patent Application No. 2020-064083 filed on Mar. 31, 2020. Each of the above application(s) is hereby expressly incorporated by reference, in its entirety, into the present application.

BACKGROUND OF THE INVENTION

1. Field of the Invention

The present invention relates to an inspection support device, an inspection support method, and a non-transitory computer recording medium storing an inspection support program, and particularly relates to a technique of supporting an inspection of a structure.

2. Description of the Related Art

Social infrastructures such as bridges need to be inspected regularly for maintenance management and repair.

JP2002-188998A discloses a cracking detection method of imaging an internal wall surface of a tunnel with a camera, performing image processing on the captured image to extract and quantify cracking for each subcategory in the internal wall surface, and displaying cracking information for each subcategory, and a display method thereof. For example, cracking is displayed in color which is different for each subcategory according to the degree of cracking for each subcategory, whereby the degree of cracking can be easily grasped.

SUMMARY OF THE INVENTION

Meanwhile, in damage to a structure, there are many types of damage other than cracking. For example, in the concrete part of the structure, there are multi-items of damage, such as water leakage, free lime, rust juice, peeling, and reinforcing bar exposure, in addition to cracking. Similarly, in the steel member of the structure, there are multi-items of damage, such as cracks, corrosion, and deterioration of anti-corrosion functions.

In JP2002-188998A, there is a description that cracking is displayed in color which is different for each subcategory according to the degree of cracking for each subcategory, but there is no description that two or more types (multi-items) of damage are detected from the structure, and there is also no description on how to output the detection results of multi-items of damage.

The present invention has been made in view of such circumstances, and an object thereof is to provide an inspection support device, an inspection support method, and an inspection support program capable of satisfactorily outputting a damage detection result thereof, in a case where two or more types of damage are detected from a structure, and particularly, two or more types of damage are detected from the same or adjacent positions of the structure.

In order to achieve the above object, an invention of a first aspect relates to an inspection support device comprising: a processor, in which the processor performs image acquisition processing of acquiring an image obtained by imaging a structure to be inspected, damage detection processing of detecting damage to the structure on the basis of the acquired image, determination processing of determining, in a case where two or more types of damage to the structure are detected by the damage detection processing, among the two or more types of damage, whether or not two or more types of damage are detected from the same or adjacent positions, and output processing of outputting a damage detection result detected by the damage detection processing, the output processing being processing of outputting the damage detection result in accordance with a priority of a damage type in a case where determination is made by the determination processing that two or more types of damage are detected from the same or adjacent positions.

According to the first aspect of the present invention, in a case where two or more types of damage to the structure are detected on the basis of the image obtained by imaging the structure to be inspected, and particularly, two or more types of damage are detected from the same or adjacent positions of the structure, the damage detection result is output in accordance with the priority, as the damage detection result. With this, the damage detection result is output in accordance with the priority of the damage type in a case where two or more types of damage are detected from the same or adjacent positions of the structure, so that it is possible to respond to the case where two or more types of damage are detected from the same or adjacent positions of the structure. In a case where two or more types of damage are not located at the same or adjacent positions of the structure, two or more types of damage detection results can be output as they are.

In the inspection support device according to a second aspect of the present invention, it is preferable that in the damage detection processing, a damage region and a damage type for each damage region are detected on the basis of the image, that in the determination processing, it is determined that whether or not two or more damage types are detected in the same or adjacent damage regions by the damage detection processing, and that in the output processing, in a case where determination is made by the determination processing that two or more damage types are detected in the same or adjacent damage regions, a damage detection result of a damage type with a highest priority is output as a damage detection result of the same or adjacent damage regions. This is because it is effective to output the damage detection result of the damage type with the highest priority and notify the user or the like, in a case where two or more types of damage are detected from the same or adjacent positions of the structure.

In the inspection support device according to a third aspect of the present invention, it is preferable that the adjacent positions are positions where a distance between the two or more types of damage is a threshold value or less.

In the inspection support device according to a fourth aspect of the present invention, it is preferable that the damage detection processing is executed by a trained model that outputs a damage region and a damage type for each damage region as a recognition result in response to an input of the image.

In the inspection support device according to a fifth aspect of the present invention, it is preferable that in the output processing, different drawing patterns are output depending on whether the damage type is linear damage or the damage type is planar damage.

In the inspection support device according to a sixth aspect of the present invention, it is preferable that in the output processing, in a case where the damage type is linear damage, a damage diagram showing a non-closed line of the linear damage is output, and in a case where the damage type is planar damage, a damage diagram showing a closed line surrounding the planar damage is output. In a case where the damage diagram is output with a drawing pattern of line drawing, a damage diagram showing a non-closed line of the linear damage is output in a case where the damage type is the linear damage, and a damage diagram showing a closed line surrounding the planar damage is output in a case where the damage type is the planar damage.

In the inspection support device according to a seventh aspect of the present invention, it is preferable that in the output processing, in a case where the damage type is linear damage, a damage image in which at least the linear damage is filled with color is output, and in a case where the damage type is planar damage, a damage image in which at least the planar damage is filled with color is output.

In the inspection support device according to an eighth aspect of the present invention, it is preferable that in the output processing, the damage detection result is output and displayed on a display, or the damage detection result is saved as a file in a memory.

In the inspection support device according to the ninth aspect of the present invention, it is preferable that the priority of the damage type is a priority set in advance according to a degree of severity of damage.

In the inspection support device according to a tenth aspect of the present invention, in a case where the damage type is linear damage including linear free lime and cracking, the linear free lime has a higher priority than the cracking.

In the inspection support device according to a eleventh aspect of the present invention, in a case where the damage type is planar damage including reinforcing bar exposure, peeling, rust juice, planar free lime, and water leakage, the priority is set to be the reinforcing bar exposure, the peeling, the rust juice, the planar free lime, and the water leakage in descending order of priority.

In the inspection support device according to a twelfth aspect of the present invention, the processor performs priority reception processing of receiving the priority of the damage type of the structure from an operation unit operated by a user, and the priority of the damage type is a priority received from the user via the operation unit.

In the inspection support device according to a thirteenth aspect of the present invention, it is preferable that the processor performs editing instruction reception processing of receiving an editing instruction for the damage detection result from an operation unit operated by a user, and editing processing of editing the damage detection result in accordance with the received editing instruction.

In the inspection support device according to a fourteenth aspect of the present invention, it is preferable that the damage detection result has items of damage identification information, the damage type, and a size, and includes a damage quantity table in which information corresponding to each item is described for each detected damage.

An invention of a fifteenth aspect relates to an inspection support method of performing inspection support for a structure to be inspected, by a processor, each processing of the processor comprising: a step of acquiring an image obtained by imaging the structure to be inspected; a step of detecting two or more types of damage to the structure on the basis of the acquired image; a step of determining, among two or more types of the detected damage to the structure, whether or not two or more types of damage are detected from the same or adjacent positions; and a step of outputting a damage detection result which was detected, the step outputting the damage detection result in accordance with a priority of a damage type in a case where determination is made in the determination step that two or more types of damage are detected from the same or adjacent positions.

An invention of a sixteenth aspect relates to a non-transitory computer recording medium storing an inspection support program that causes a computer to execute a method of performing inspection support for a structure to be inspected, the method comprising: a step of acquiring an image obtained by imaging the structure to be inspected; a step of detecting two or more types of damage to the structure on the basis of the acquired image; a step of determining, among two or more types of the detected damage to the structure, whether or not two or more types of damage are detected from the same or adjacent positions; and a step of outputting a damage detection result which was detected, the step outputting the damage detection result in accordance with a priority of a damage type in a case where determination is made in the determination step that two or more types of damage are detected from the same or adjacent positions.

According to the present invention, in a case where two or more types of damage are detected from a structure, and particularly, two or more types of damage are detected from the same or adjacent positions of the structure, the damage detection result can be satisfactorily output.

BRIEF DESCRIPTION OF THE DRAWINGS

FIGS. 4A and 4B are views showing a type of a damage representation method corresponding to a type of damage, in which FIG. 4A is a view showing an image including cracking, and FIG. 4B is a view showing an image in which a polyline along the cracking is drawn.

FIGS. 5A and 5B are views showing the type of the damage representation method corresponding to the type of damage, in which FIG. 5A is a view showing an image including peeling and reinforcing bar exposure, and FIG. 5B is a view showing an image in which polygons surrounding regions of the peeling and the reinforcing bar exposure are drawn.

FIGS. 6A and 6B are views showing the type of the damage representation method corresponding to the type of damage, in which FIG. 6A is a view showing an image including planar free lime, and FIG. 6B is a view showing an image in which a polygon surrounding a region of the planar free lime is drawn.

FIG. 10 is a conceptual diagram showing an embodiment of a damage detection processing unit composed of a CPU or the like.

FIGS. 24A and 24B are image views of a GUI showing a third embodiment of a damage detection result output, in which FIG. 24A is a view showing a case where "10" is set as the transparency of fill color of a damage image, and FIG. 24B is a view showing a composite image in which the damage image having a transparency of "10" is superimposed and displayed on an image obtained by imaging the structure.

FIGS. 25A and 25B are image views of the GUI showing the third embodiment of the damage detection result output, in which FIG. 25A is a view showing a case where "50" is set as the transparency of the fill color of the damage image, and FIG. 25B is a view showing a composite image in which the damage image having a transparency of "50" is superimposed and displayed on the image obtained by imaging the structure.

FIGS. 26A and 26B are image views of the GUI showing the third embodiment of the damage detection result output, in which FIG. 26A is a view showing a case where "100" is set as the transparency of the fill color of the damage image, and FIG. 26B is a view showing a composite image in which the damage image having a transparency of "100" is superimposed and displayed on the image obtained by imaging the structure.

DESCRIPTION OF THE PREFERRED EMBODIMENTS

Hereinafter, preferred embodiments of an inspection support device, an inspection support method, and an inspection support program according to the present invention will be described with reference to the accompanying drawings.

Outline of Present Invention

Figure 1A:
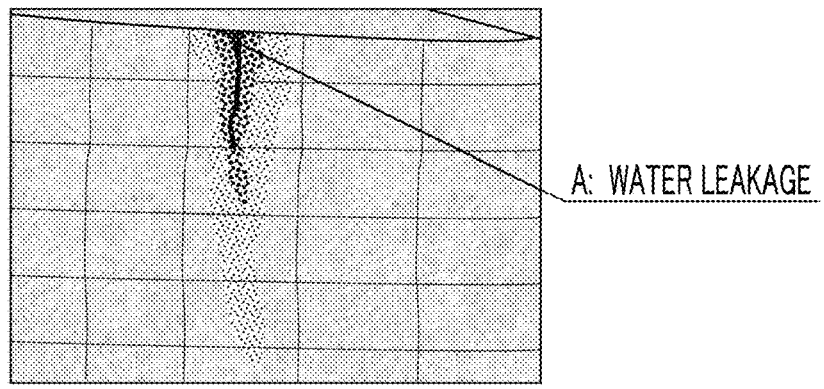
FIGS. 1A to 1C are views showing an example of damage to a structure.
Figure 1B:
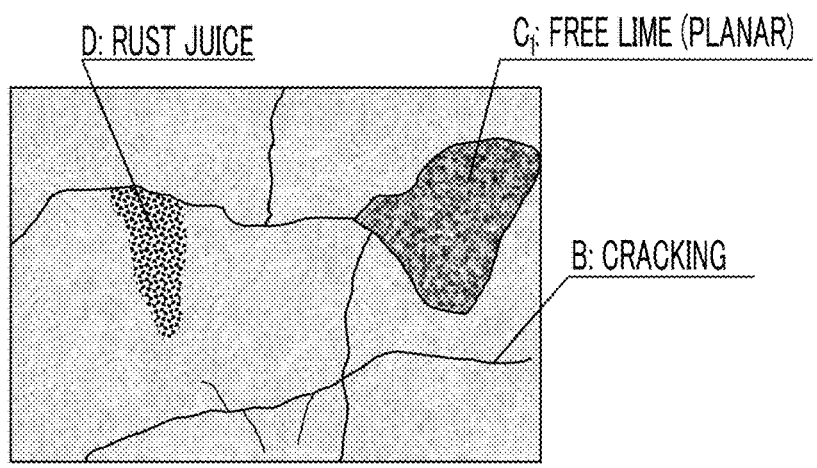
Figure 1C:
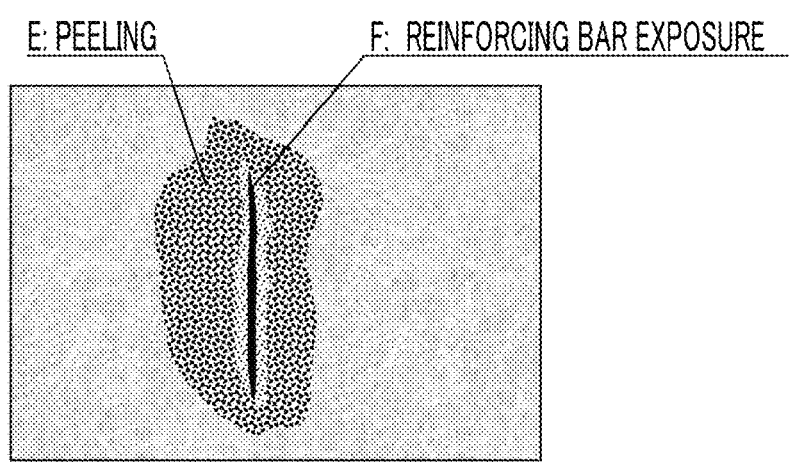

FIGS. 1A to 1C are views showing an example of damage to a structure, and particularly show damage to a concrete member constituting the structure.

FIG. 1A shows water leakage A, which is one of the phenomena caused by damage to the concrete member. The water leakage A is caused by damage to the concrete member (cracking, joint cracking, defective joint material, and the like), and water leaks from the damaged portion.

FIG. 1B shows cracking B, free lime $C_1$, and rust juice D occurring in the concrete member. The free lime $C_1$ refers to a phenomenon in which a lime component flows out from the inside of the concrete member due to water leakage or the like and the lime component appears on the surface when moisture evaporates. Further, the rust juice D refers to a liquid in which steel materials such as reinforcing bars provided inside the concrete member are corroded and brown corrosion products exude to the concrete surface.

FIG. 1C shows peeling E and reinforcing bar exposure F occurring in the concrete member. The peeling E refers to a state in which floating concrete pieces are peeled off, and the reinforcing bar exposure F refers to a state in which reinforcing bar provided in the concrete is exposed as a result of the peeling E.

Further, although not shown, as damage to the steel member constituting the structure, there are types of damage, such as cracks, corrosion, fracture, and deterioration of anti-corrosion functions.

Figure 2A:
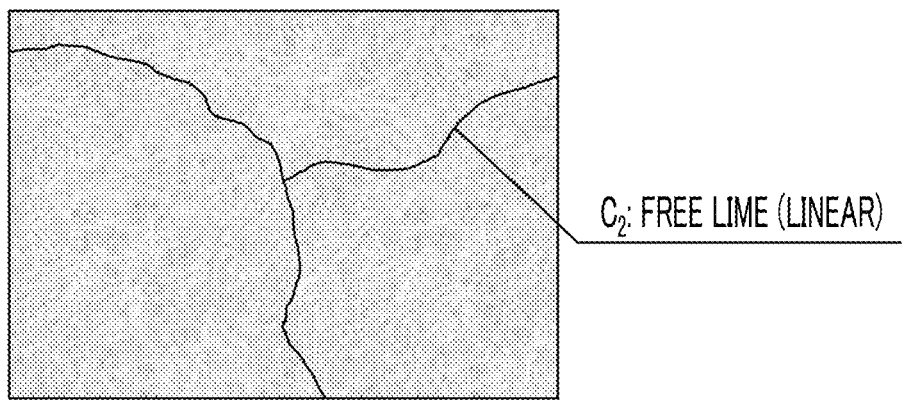
FIGS. 2A and 2B are views showing an example of linear free lime.
Figure 2B:
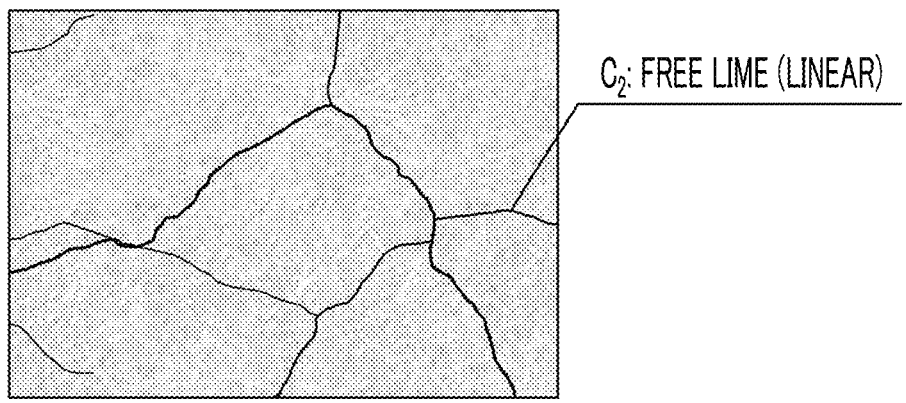
Figure 3A:
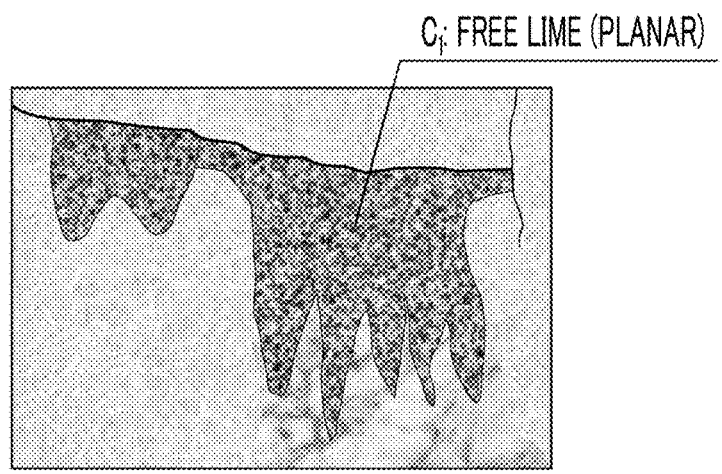
FIGS. 3A to 3C are views showing an example of planar free lime.
Figure 3B:
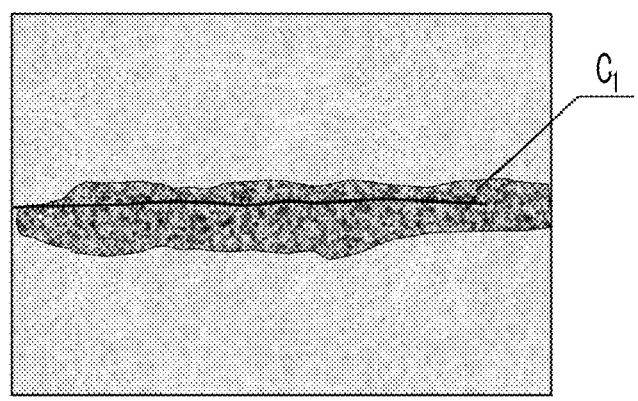
Figure 3C:
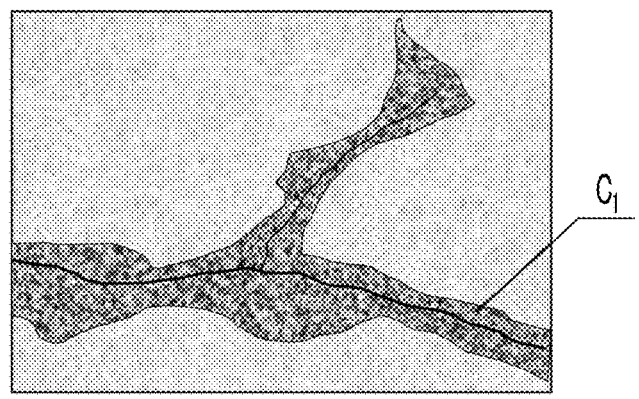

FIGS. 2A and 2B are views showing an example of linear free lime, and FIGS. 3A to 3C are views showing an example of planar free lime.

Linear free lime $C_2$ shown in FIGS. 2A and 2B is a state in which cracking occurring in the concrete member is clogged with the lime component. Therefore, the linear free lime $C_2$ and the cracking have substantially the same shape, and the linear free lime $C_2$ has cracking occurring in the same position (region) as the position where the linear free lime $C_2$ occurs.

The planar free lime shown in FIG. 3A spreads below the cracking with water leakage from the cracking extending in the horizontal direction. The planar free lime $C_1$ shown in FIG. 3B spreads around joint cracking, and the planar free lime $C_1$ shown in FIG. 3C spreads around concrete cracking.

In one aspect of the present invention, damage to the structure to be inspected is detected from an image obtained by imaging the structure, and a damage detection result is output in accordance with the type of the detected damage.

FIGS. 4A to 6B are views showing the types of damage representation methods corresponding to the types of damage.

Figure 4A:
Figure 4B:
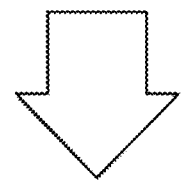
Figure 4B:

As shown in FIGS. 4A and 4B, in a case where cracking is detected (FIG. 4A), a drawing pattern using a non-closed line (polyline) along the cracking (FIG. 4B) is used as a method of representing cracking. This is because it is necessary to quantify the length in the case of linear damage such as cracking.

Therefore, as a method of representing linear free lime, the drawing pattern using the polyline along the linear free lime is output even in a case where linear free lime is detected as shown in FIGS. 2A and 2B. Further, cracking and linear free lime are both linear damage, but it is preferable to represent the cracking and the linear free lime in an identifiable manner with polylines having different line types (for example, color) because the types of damage are different from each other.

Figure 5A:
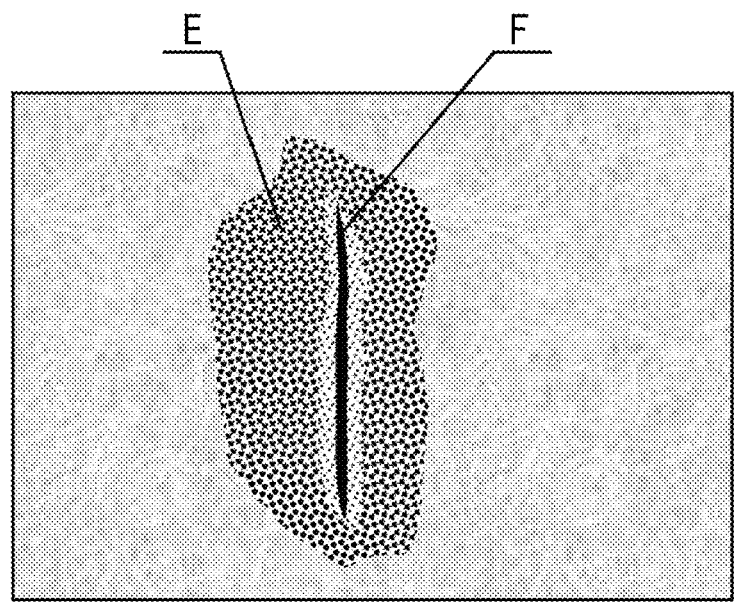
Figure 5B:
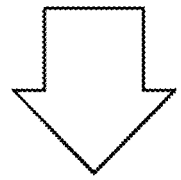
Figure 5B:
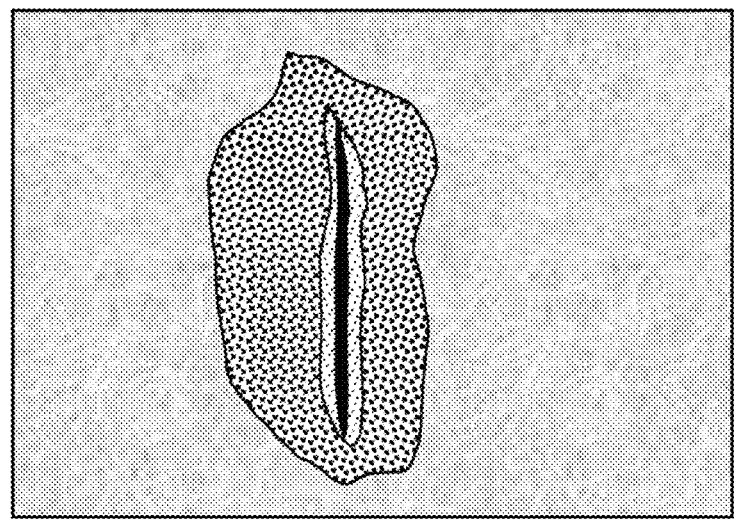

As shown in FIGS. 5A and 5B, in a case where peeling E and reinforcing bar exposure F are detected (FIG. 5A), a drawing pattern using a closed line (polygon) surrounding the region of planar damage (FIG. 5B) is used as a method of representing peeling E and reinforcing bar exposure F. This is because it is necessary to quantify the area in the case of planar damage such as peeling E.

Figure 6A:
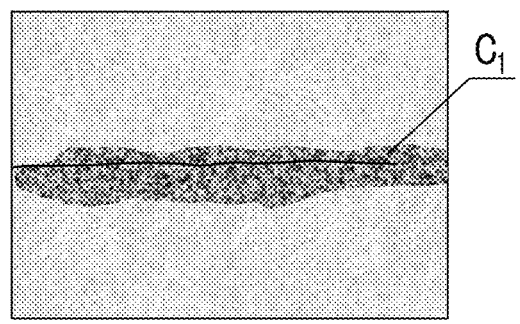
Figure 6A:
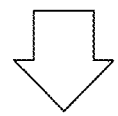
Figure 6B:
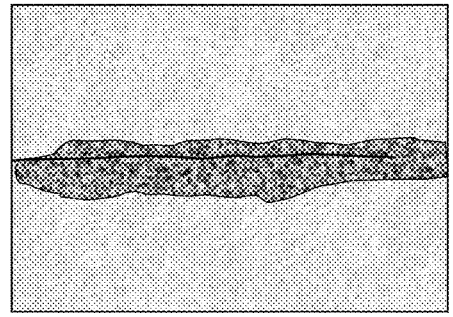

As shown in FIGS. 6A and 6B, in a case where planar free lime $C_1$ is detected (FIG. 6A), the drawing pattern using a closed line (polygon) surrounding the region of planar damage (FIG. 6B) is used as a method of representing planar free lime $C_1$.

The planar free lime $C_1$, the peeling E, and the reinforcing bar exposure F are all planar damage, but it is preferable to represent the planar free lime $C_1$, the peeling E, and the reinforcing bar exposure F in an identifiable manner with polygons having different line types (for example, color) because the types of damage are different from each other.

In one aspect of the present invention, in a case where the shapes of damage are different from each other even when the damage is classified as the same damage, the types of damage are set to be different from each other and are represented in different drawing patterns according to the shapes of damage. For example, linear free lime is represented by polylines, and planar free lime is represented by polygons.

In addition, two or more types of damage may be detected from the same or adjacent positions on the structure (image). Here, the adjacent positions refer to positions where the distance between two or more types of damage is a threshold value or less. The threshold value may be decided by default or set by a user.

For example, in the case of linear free lime, the linear free lime and the concrete cracking overlap with each other, and two types of damage are detected in the same position. Further, as shown in FIGS. 5A and 5B, in the case of the peeling E and the reinforcing bar exposure F, the reinforcing bar exposure F exists in the peeling E. Therefore, the distance between the two types of damage, that is, the reinforcing bar exposure F and the peeling E, is the threshold value or less, and both the reinforcing bar exposure F and the peeling E are damage located in adjacent positions.

Figure 7:
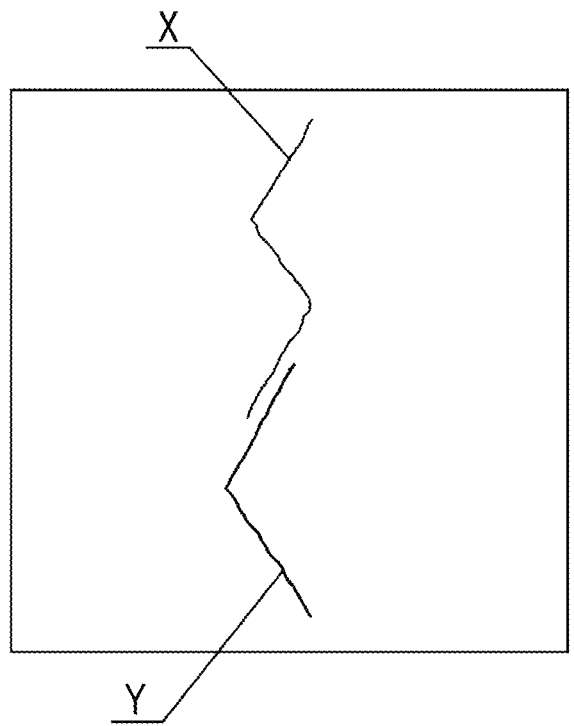
FIG. 7 is a view showing respective polylines in a case where cracking and linear free lime, which are linear damage, are detected.

FIG. 7 is a view showing respective polylines in a case where cracking and linear free lime, which are linear damage, are detected.

In FIG. 7, X is a polyline showing cracking and Y is a polyline showing linear free lime.

FIGS. 8A to 8F are views used to illustrate a determination of adjacency between the cracking and the linear free lime, which are the linear damage shown in FIG. 7.

Hereinafter, with reference to FIGS. 8A to 8F, an example of determining "adjacency" between two types of damage, that is, cracking and linear free lime, will be described.

Figure 8A:
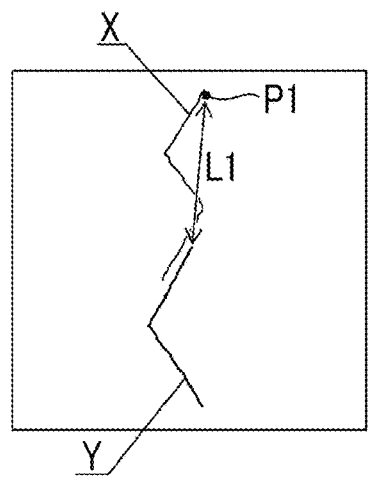
FIGS. 8A to 8F are views used to illustrate a determination of adjacency between the cracking and the linear free lime, which are the linear damage shown in FIG. 7.

As shown in FIG. 8A, the shortest distance between a point of interest P1 of a polyline X showing cracking (a first vertex which is the endpoint of the polyline X) and the polyline of the linear free lime is denoted by L1.

Figure 8D:
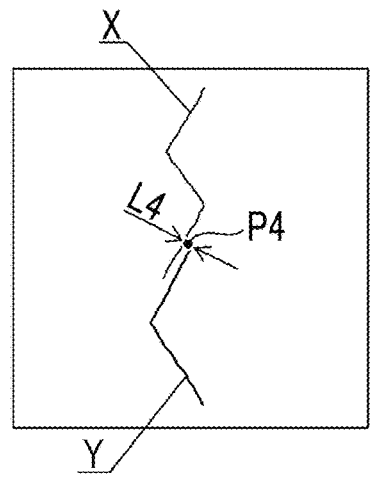
Figure 8B:
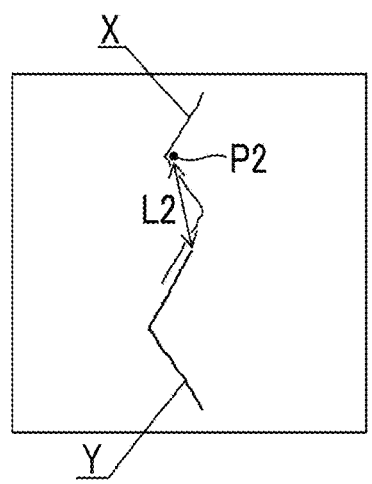
Figure 8E:
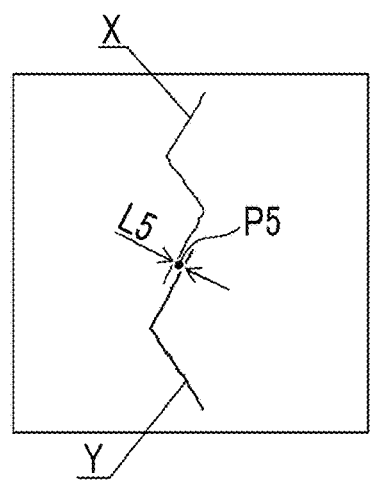
Figure 8C:
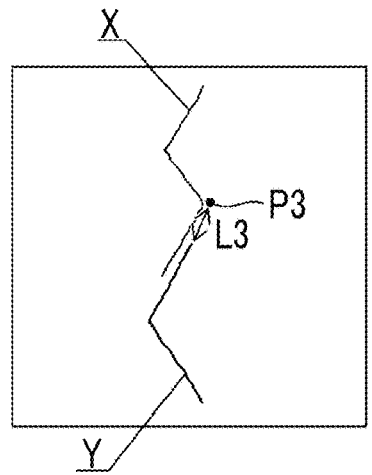

Similarly, as shown in FIG. 8B, the shortest distance between a point of interest P2 (second vertex) of the polyline X and a polyline Y is denoted by L2, and as shown in FIG. 8C, the shortest distance between a point of interest P3 (third vertex) of the polyline X and the polyline Y is denoted by L3.

Figure 8F:
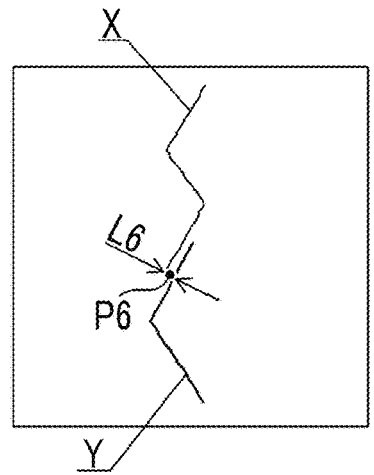

Further, as shown in FIGS. 8D to 8F, the shortest distances in the two polylines X and Y are denoted by L4, L5, and L6, respectively. The shortest distance L4 is the shortest distance at a point of interest 4 of the polyline Y (the vertex which is the endpoint of the polyline Y), the shortest distance L5 is the shortest distance at a point of interest 5 of the polylines X and Y (a point of interest in the middle of the point of interest 4 and the point of interest 6), and the shortest distance L6 is the shortest distance at a point of interest 6 of the polyline X (the vertex which is the other endpoint of the polyline X).

Then, in a case where L1, L2, L3>threshold value is satisfied and L4, L5, L6≤threshold value is satisfied, determination is made that the two polylines Y and X (two types of damage) are "adjacent" to each other in the range of L4 to L6. The number of points of interest P1 to P6 is not limited to the above example.

Further, in the above example, the distance between the two types of linear damage has been described, but for the distance between the linear damage and the planar damage, the determination of "adjacency" can also be made by obtaining the shortest distance between each point of interest of the polyline and the polygon, as in the above example.

In one aspect of the present invention, a priority is defined according to the type of damage, and in a case where two or more types of damage are detected from the same or adjacent positions, the damage is represented in accordance with the priority. The details of the damage representation method corresponding to the priority will be described later.

[Hardware Configuration of Inspection Support Device]

Figure 9:
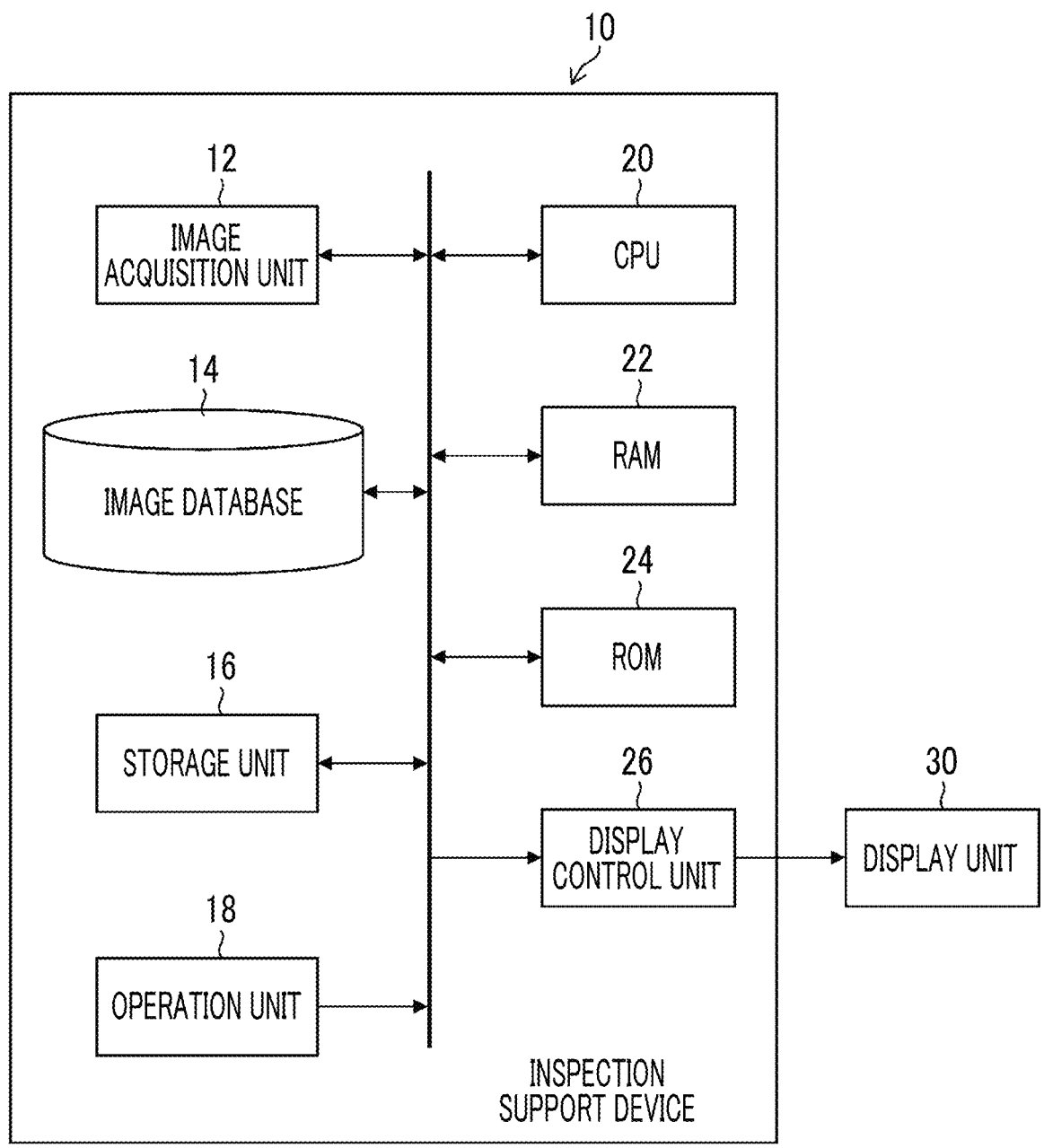
FIG. 9 is a block diagram showing an example of a hardware configuration of an inspection support device according to the present invention.

FIG. 9 is a block diagram showing an example of a hardware configuration of the inspection support device according to the present invention.

As an inspection support device 10 shown in FIG. 9, a personal computer or a workstation can be used. The inspection support device 10 of this example is mainly composed of an image acquisition unit 12, an image database 14, a storage unit 16, an operation unit 18, a central processing unit (CPU) 20, a random access memory (RAM) 22, a read only memory (ROM) 24, and a display control unit 26.

The image acquisition unit 12 corresponds to an input/output interface, and acquires, for example, a captured image obtained by imaging the structure to be inspected, in this example. Examples of the structure to be inspected include structures such as a bridge and a tunnel.

The image acquired by the image acquisition unit 12 is a large number of images (captured image group) obtained by imaging the structure with, for example, a drone (unmanned aerial vehicle) or a robot on which a camera is mounted, or with human hands. It is preferable that the captured image group covers the entire structure and the adjacent captured images overlap with each other.

The captured image group acquired by the image acquisition unit 12 is stored in the image database 14.

The storage unit 16 is a memory composed of a hard disk device, a flash memory, and the like, and the storage unit 16 stores, for example, information indicating the priority of the damage type, a computer-aided design (CAD) data indicating the structure, and filed damage inspection results, in addition to an operating system and an inspection support program. The damage inspection result can be stored as damage information in different layers for each type of damage. The damage information includes a damage diagram.

As CAD data, in a case where the CAD data of the structure to be inspected exists, the CAD data can be used. In a case where the CAD data of the structure does not exist, CAD data can be automatically created on the basis of the captured image group saved in the image database 14.

In a case where the captured image group stored in the image database 14 is captured by the camera mounted on the drone, feature points between the captured images that overlap with each other in the captured image group can be extracted, the position and the orientation of the camera mounted on the drone can be estimated on the basis of the extracted feature points, and a three-dimensional point cloud model in which three-dimensional position of the feature points is estimated at the same time from the estimation result of the position and the orientation of the camera can be generated.

There is a structure from motion (SfM) method of tracking motions of multiple feature points from the captured image group in which the imaging position of the camera is moved by the drone, and estimating a three-dimensional structure (structure) of a subject and a camera orientation (motion) at the same time. In recent years, an optimization calculation method called bundle adjustment has been developed to enable high-accuracy output.

As the camera parameters (a focal length, an image size of an image sensor, a pixel pitch, and the like) required in a case where the SfM method is applied, parameters stored in the storage unit 16 can be used. In addition, the CAD data of the structure can be generated on the basis of the generated three-dimensional point cloud model.

The operation unit 18 includes a keyboard, a mouse, and the like that are connected to a computer in a wired or wireless manner, and functions as an operation unit that gives a normal operation instruction to the computer, and also functions as an operation unit that edits the damage detection result of the structure detected on the basis of the image obtained by imaging the structure through a user's operation and that sets the priority of a plurality of damage types of the structure through the user's operation. Details such as the editing of the damage detection result and the setting of the priority of the damage type will be described later.

The CPU 20 reads out various programs stored in the storage unit 16, the ROM 24, or the like, controls each unit in an integrated manner, and performs damage detection processing of detecting the damage (two or more types of damage) to the structure on the basis of the image obtained by imaging the structure, determination processing of determining whether or not two or more types of damage are detected from the same or adjacent positions, output processing of outputting the damage detection result detected by the damage detection processing, and the like.

The damage detection processing of detecting two or more types of damage on the basis of the image obtained by imaging the structure can be performed by artificial intelligence (AI).

As the AI, for example, a trained model using a convolution neural network (CNN) can be used.

Figure 10:
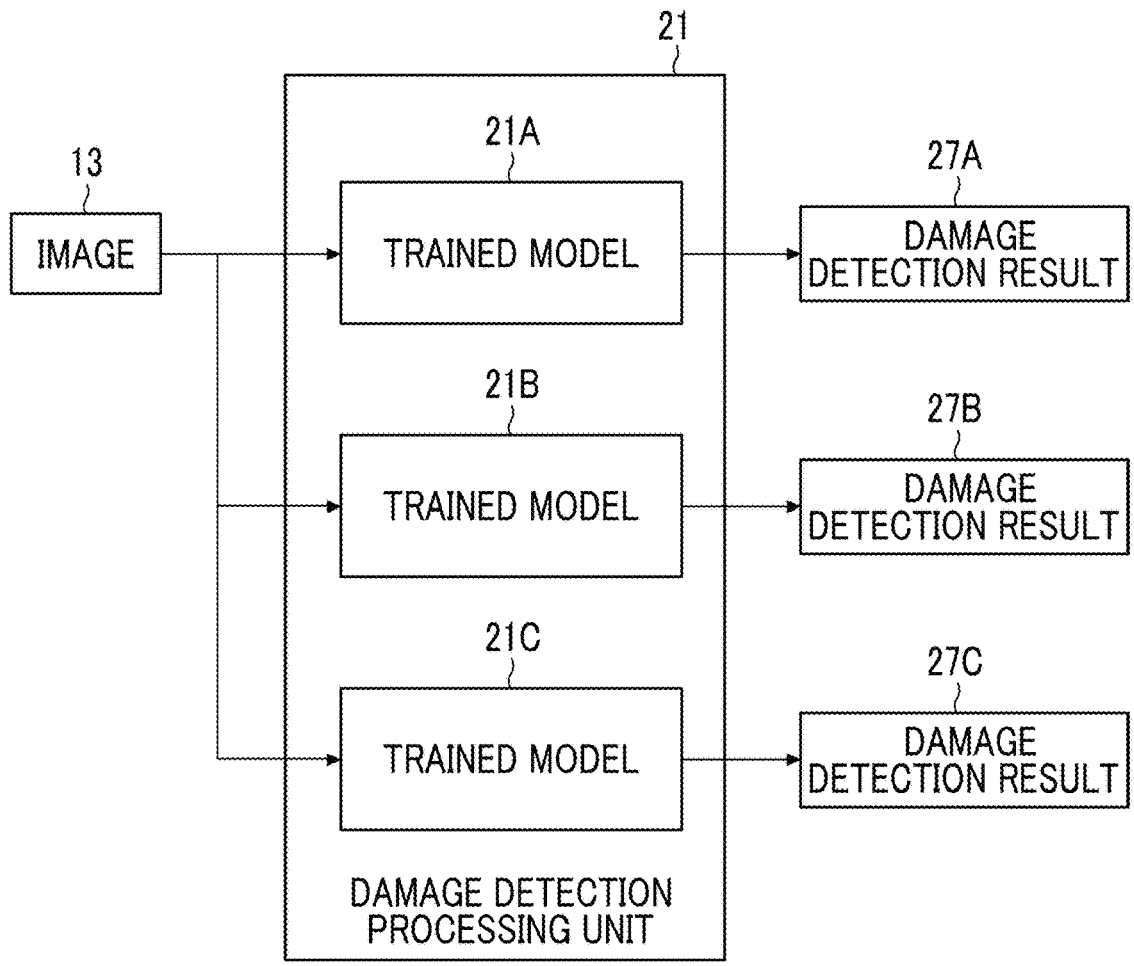

FIG. 10 is a conceptual diagram showing the embodiment of the damage detection processing unit composed of the CPU or the like.

In FIG. 10, a damage detection processing unit 21 is composed of a plurality of (three in this example) trained models 21A, 21B, and 21C corresponding to a plurality of types of damage.

Each of the trained models 21A, 21B, and 21C comprises an input layer, a middle layer, and an output layer, and each layer has a structure in which a plurality of "nodes" are connected by "edges".

An image 13 obtained by imaging the structure is input to the input layer of the CNN. The middle layer has a plurality of sets each including a convolutional layer and a pooling layer, and is a part that extracts a feature from the image input from the input layer. The convolutional layer acquires a "feature map" by performing filter processing (performing convolution calculation using a filter) on a nearby node in the previous layer. The pooling layer generates a new feature map by reducing the feature map output from the convolutional layer. The "convolutional layer" plays a role of performing feature extraction such as edge extraction from the image, and the "pooling layer" plays a role of providing robustness such that the extracted feature is not affected by translation or the like.

The output layer of the CNN is a part that outputs the feature map showing the feature extracted by the middle layer. The output layers of the trained models 21A, 21B, and 21C of this example output, for example, inference results obtained by classifying (segmentation) a region for each damage to the structure shown in the image into regions in a pixel unit or in a unit of a group of some pixels, as the damage detection results 27A, 27B, and 27C.

For example, the trained model 21A is a trained model that has performed machine learning to detect damage, that is, water leakage, planar free lime, and rust juice, and outputs the damage region of each of water leakage, planar free lime, and rust juice and the damage type for each damage region, as the damage detection result (recognition result) 27A. The trained model 21B is a trained model that has performed machine learning to detect damage, that is, peeling and reinforcing bar exposure, and outputs the damage region of each of peeling and reinforcing bar exposure and the damage type for each damage region, as the damage detection result 27B. The trained model 21C is a trained model that has performed machine learning to detect damage, that is, cracking and linear free lime, and outputs the damage region of each of cracking and linear free lime and the damage type for each damage region, as the damage detection result 27C.

The damage detection processing unit 21 is not limited to the above embodiment, and for example, may have an individual trained model for each damage type, and each trained model may be configured to output the damage region corresponding to each damage type as the damage detection result. In this case, the same number of trained models as the number of damage types to be inspected is provided. Alternatively, the damage detection processing unit 21 may have one trained model capable of responding to all damage types, and may be configured to output the damage region and the damage type for each damage region, as the damage detection result.

Returning to FIG. 9, the CPU 20 outputs and displays the damage detection result detected by the damage detection processing on a display unit (display) 30 via the display control unit 26, or saves the damage detection result as a file in the storage unit (memory) 16.

The RAM 22 is used as a work area of the CPU 20, and is also used as a storage unit that temporarily stores the read-out program or various types of data.

The display control unit 26 is a part that creates display data to be displayed on the display unit 30 and that outputs the created display data to the display unit 30, and in this example, causes the display unit 30 to display the damage detection result detected by the CPU 20, and causes the display unit 30 to display, for example, a screen for editing the damage detection result based on the user's operation from the operation unit 18.

As the display unit 30, various displays such as a liquid crystal monitor that can be connected to a computer are used, and the display unit 30 displays the damage detection result detected from the image and the like together with the image obtained by imaging the structure input from the display control unit 26, and is used as a part of a user interface together with the operation unit 18.

The processor including the CPU 20 of the inspection support device 10 having the above configuration reads out the inspection support program stored in the storage unit 16 or the ROM 24 and executes the inspection support program to perform each processing as described above.

<Action of Inspection Support Device>

Next, the action of the inspection support device 10 shown in FIG. 9 will be described by using a bridge as an example of the structure.

Figure 11:
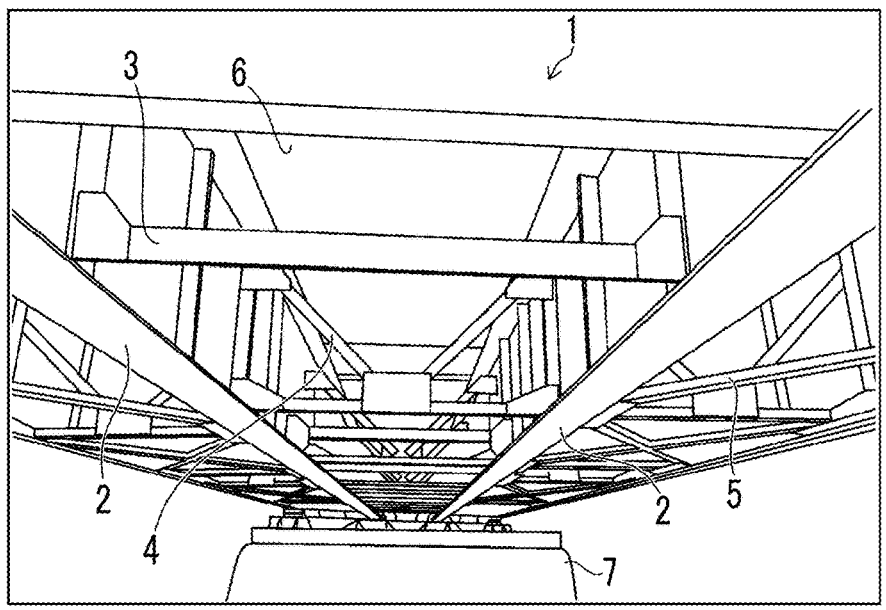
FIG. 11 is a perspective view showing an example of a bridge to be inspected.

FIG. 11 is a perspective view showing an example of a bridge to be inspected.

As shown in FIG. 11, a bridge 1 is composed of various members including a main girder 2 spanning between bridge piers 7, a cross-beam 3 provided in a direction orthogonal to the main girder 2 and connecting main girders to each other, a sway brace 4 interconnecting the main girders 2, and a lateral brace 5, and a floor slab 6 that is used to travel a vehicle or the like is provided on the upper part of the main girder or the like. The floor slab 6 is generally made of reinforced concrete.

The floor slab 6 has usually a rectangular coffer defined by the main girders 2 and the cross-beams 3 as a basic unit, and inspections are performed in a coffer unit in a case where damage to the floor slab (cracking, concrete peeling, and the like) is inspected.

Each coffer of the floor slab is one of the members (inspection units) constituting the structure (bridge). Examples of the inspection unit of the bridge include the part/member classifications (the main girder 2, the cross-beam 3, the sway brace 4, the lateral brace 5, and the bridge pier 7 (pillars/walls, beams, and corners/joints)) that constitute the structure, in addition to the floor slab (coffer).

The CPU 20 of the inspection support device 10, the inspection support program stored in the storage unit 16, the RAM 22 and the ROM 24, the display control unit 26, and the like constitute a processor, and the processor performs various types of processing shown below.

The processor performs an image acquisition processing of acquiring an image of the inspection unit from among a plurality of images obtained by imaging the structure to be inspected (bridge 1) and stored in the image database 14.

Figure 12:
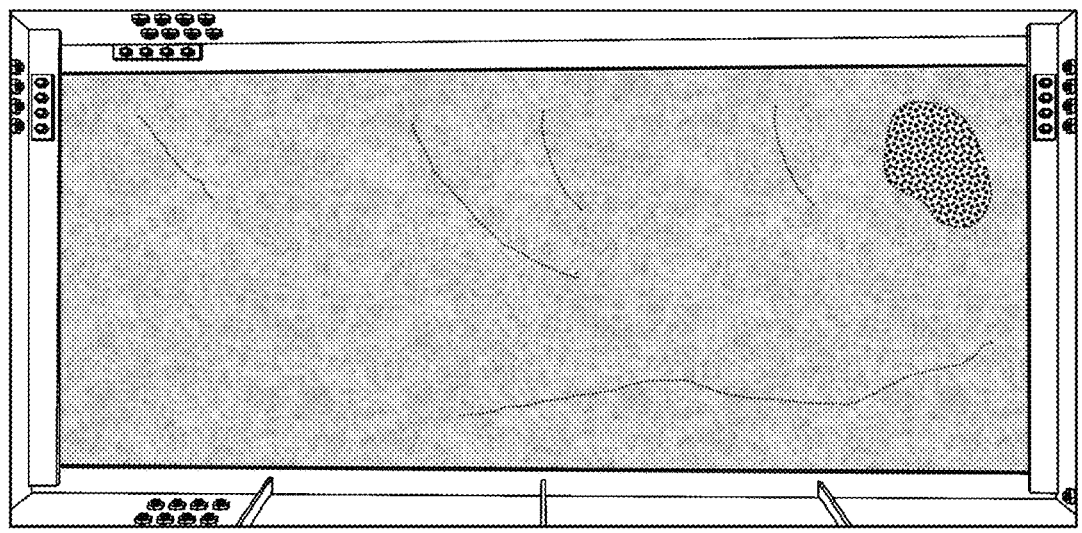
FIG. 12 is a view showing an example of an orthoimage corresponding to a coffer, which is one of inspection units of the bridge.

FIG. 12 is a view showing an example of an orthoimage corresponding to the coffer, which is one of the inspection units of the bridge.

The orthoimage is an image in which the image obtained by imaging the structure (coffer) is orthographically projected onto the surface of the coffer. The orthoimage of one coffer can be created by extracting a plurality of images corresponding to the coffer from the captured image group stored in the image database 14, by performing panorama composition with the plurality of extracted images, and by projection-transforming the image obtained by the panorama composition onto the surface of the coffer.

In a case where the orthoimage (image 13) of the coffer is input, the damage detection processing unit 21 shown in FIG. 10 detects damage in the coffer on the basis of the input image 13 of the coffer and outputs the damage detection results 27A to 27C.

Figure 13:
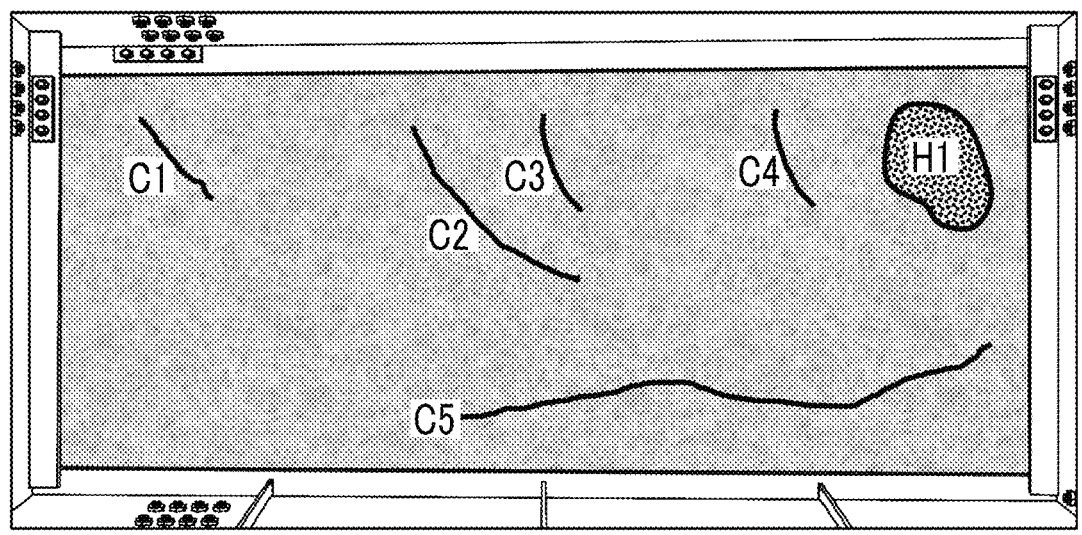
FIG. 13 is a view showing an example of a damage detection result detected on the basis of the orthoimage shown in FIG. 12.

FIG. 13 is a view showing an example of the damage detection result detected on the basis of the orthoimage shown in FIG. 12.

The damage detection result shown in FIG. 13 shows a damage diagram showing damage to the coffer to be inspected.

In the damage diagram shown in FIG. 13, five cracking C1 to C5 and concrete peeling H1 are shown.

In the damage diagram shown in FIG. 13, damage is represented by a drawing pattern with the polyline along each of the cracking C1 to C5 (linear damage) detected on the orthoimage, a drawing pattern with the polygon surrounding the region of the peeling H1 (planar damage), or an image in which the inside of the polygon is filled with color.

Figures 14, 15:
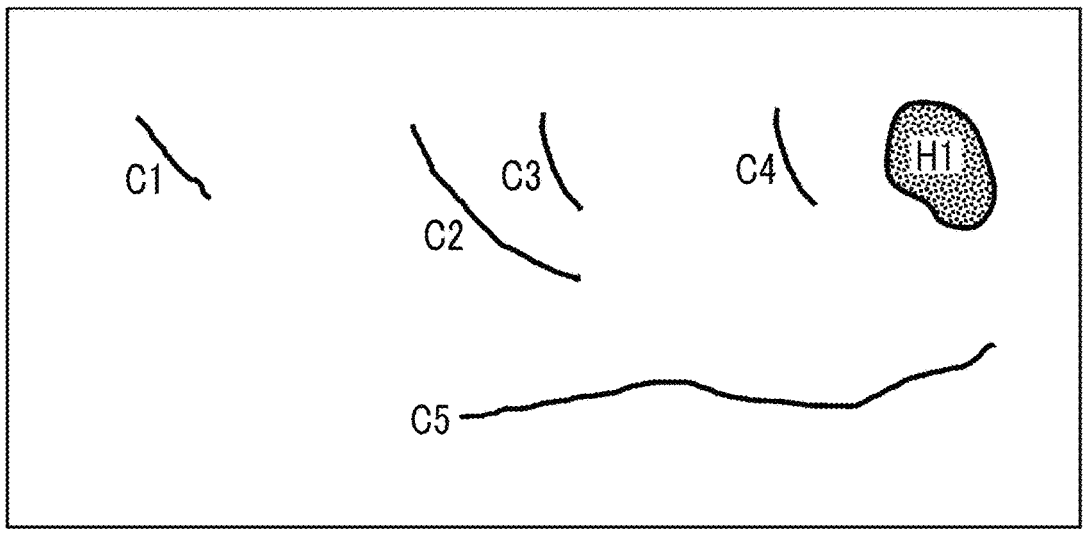
FIG. 14 is a view showing an example of an orthoimage on which a damage diagram corresponding to the coffer is superimposed.
FIG. 15 is a chart showing an example of a damage quantity table included in the damage detection result.

FIG. 14 is a view showing an example of the orthoimage on which the damage diagram corresponding to the coffer is superimposed.

The orthoimage shown in FIG. 14, on which the damage diagram is superimposed, can be created by superimposing the damage diagram shown in FIG. 13 on the orthoimage shown in FIG. 12.

The damage diagram can be created by coloring the damaged portion with a color corresponding to the damage type, and the damage diagram is superimposed on the orthoimage so that the damaged portion can be easily visually recognized.

FIG. 15 is a chart showing an example of a damage quantity table included in the damage detection result.

The damage quantity table shown in FIG. 15 has items of damage identification information (ID: identification), the damage type, a size (width), a size (length), and a size (area), and information corresponding to each item is described for each damage.

The length and the width of each of the cracking C1 to C5 are quantified in the case of cracking which is linear damage, and the area of the region of the peeling H1 is quantified in the case of peeling which is planar damage, and this information is described in association with the damage ID in the damage quantity table.

First Embodiment of Damage Detection Result Output

Figure 16A:
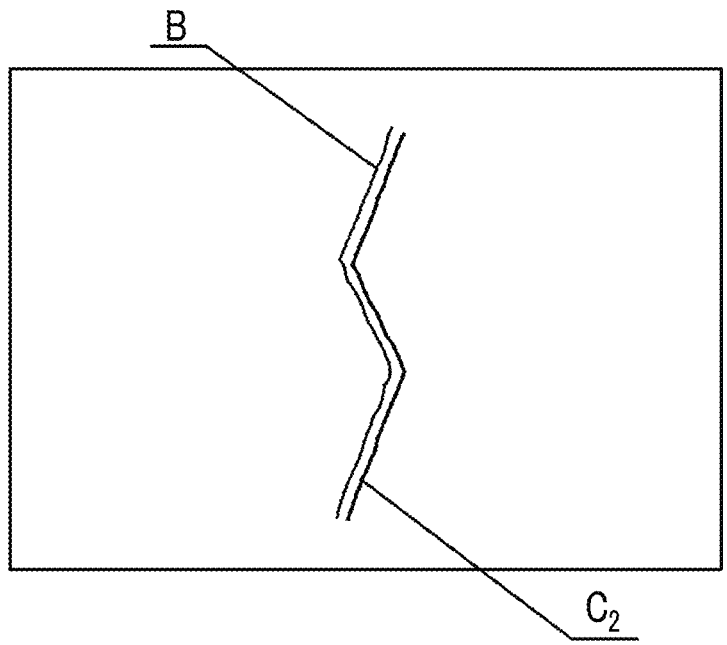
FIGS. 16A and 16B are schematic views showing an example of damage detection results of cracking and linear free lime by the damage detection processing unit and output processing thereof.
Figure 16B:
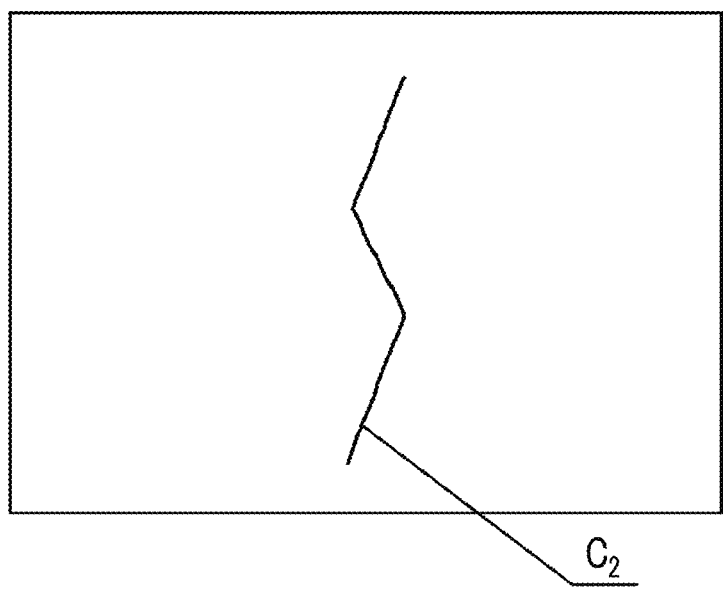

FIGS. 16A and 16B are schematic views showing an example of the damage detection results of cracking and linear free lime by the damage detection processing unit and output processing thereof.

FIG. 16A shows a case where the image 13 is input to the damage detection processing unit 21 (trained model 21C) shown in FIG. 10, and the damage detection results showing the respective damage regions of cracking B and linear free lime $C_2$ and the damage type for each damage region are detected by the trained model 21C. In this case, the CPU 20 performs determination processing of determining whether or not these cracking B and linear free lime $C_2$ are detected from the same or adjacent positions.

In the example shown in FIG. 16A, the cracking B and the linear free lime $C_2$ are shown side by side for convenience, but the linear free lime $C_2$ is linear free lime in a state in which the cracking B occurring in the concrete member is clogged with a lime component. Therefore, the linear free lime $C_2$ and the cracking B have substantially the same shape, and the linear free lime $C_2$ has the cracking B occurring in the same position (region) as the position where the linear free lime $C_2$ occurs.

In the case of the cracking B and the linear free lime $C_2$ shown in FIG. 16A, the CPU 20 determines that the cracking B and the linear free lime $C_2$ are detected from the same or adjacent positions. Then, in a case where the CPU 20 determines that the cracking B and the linear free lime $C_2$ are detected from the same or adjacent positions, the CPU 20 performs output processing of outputting the damage detection result in accordance with the priority of the damage type.

In this example, since the priority of the linear free lime $C_2$ is set higher than that of the cracking B as the priority of the damage type, the CPU 20 causes the display unit 30 to display a damage image in which the region of the linear free lime $C_2$ is filled with color, via the display control unit 26, as shown in FIG. 16B, or outputs the CAD data of the damage diagram showing the polyline of the linear free lime $C_2$ as a file. It is preferable that the file of the CAD data of the damage diagram is stored in the storage unit 16 in association with the image in which the damage is detected.

Figure 17A:
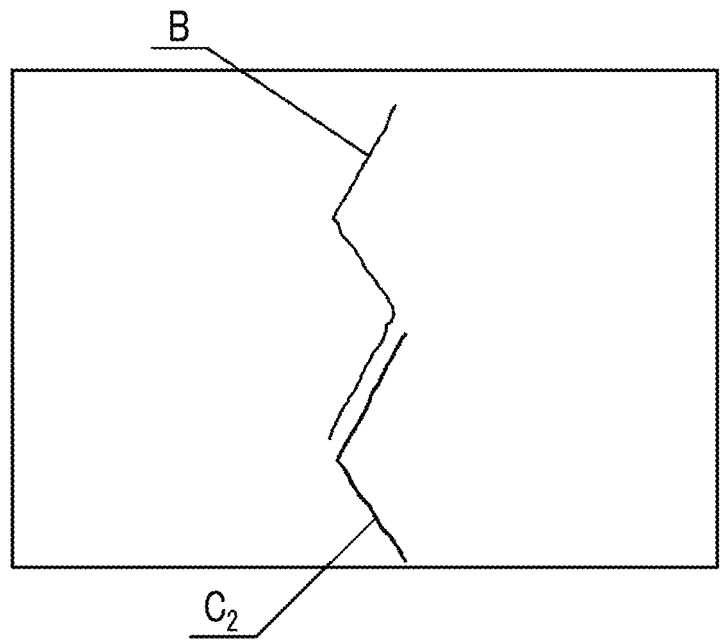
FIGS. 17A and 17B are schematic views showing another example of the damage detection results of cracking and linear free lime by the damage detection processing unit and the output processing thereof.
Figure 17B:
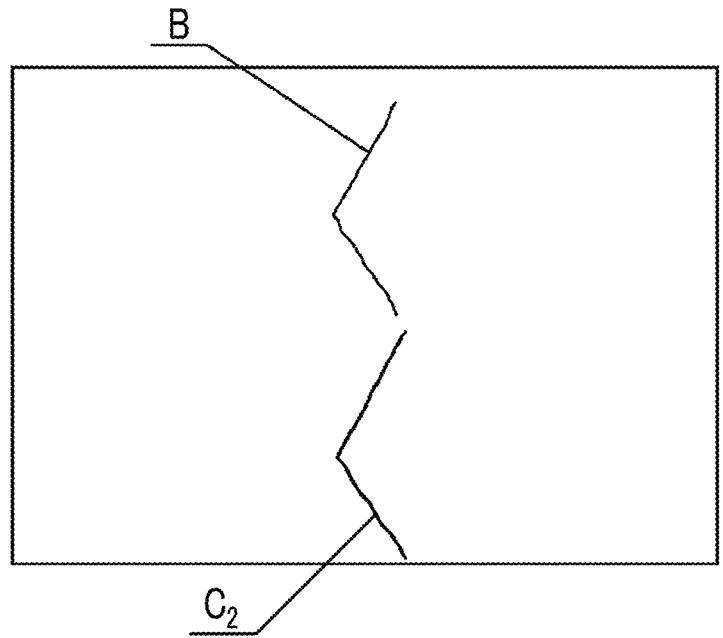

FIGS. 17A and 17B are schematic views showing another example of the damage detection results of cracking and linear free lime by the damage detection processing unit and the output processing thereof.

In the example shown in FIG. 17A, cracking B and linear free lime $C_2$ are detected, and a part of cracking B and a part of linear free lime $C_2$ occur in the same position.

In this case, the CPU 20 determines that the part of the cracking B and the part of the linear free lime $C_2$ are detected from the same position. Then, for the overlapping part of the part of the cracking B and the part of the linear free lime $C_2$, the CPU 20 causes the display unit 30 to display a damage image in which the region of the linear free lime $C_2$ is filled with color, via the display control unit 26, as shown in FIG. 17B, or outputs the CAD data of the damage diagram showing the polyline of the linear free lime $C_2$ as a file.

For the remaining part of the cracking B that does not overlap with the linear free lime $C_2$, the CPU 20 causes the display unit 30 to display a damage image in which the region of the cracking B is filled with color as it is, via the display control unit 26, or outputs the CAD data of the damage diagram showing the polyline of the cracking B as a file. Further, it is preferable to make the CAD data and the damage image showing the cracking B and the CAD data and the damage image showing the linear free lime $C_2$ have different line types (for example, color) so as to be identifiable.

Figure 18A:
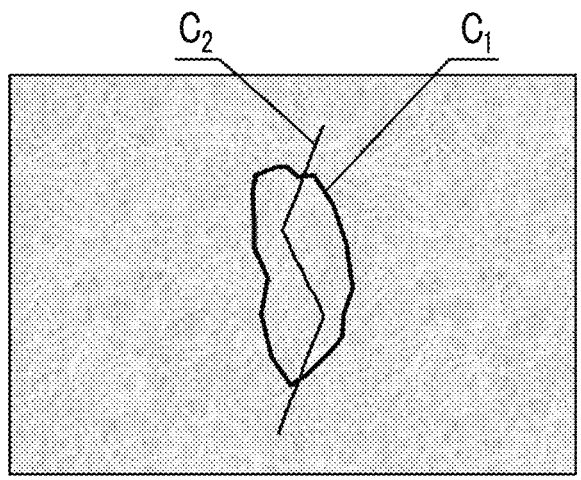
FIGS. 18A to 18C are schematic views showing an example of damage detection results of planar free lime and linear free lime by the damage detection processing unit and output processing thereof.
Figure 18B:
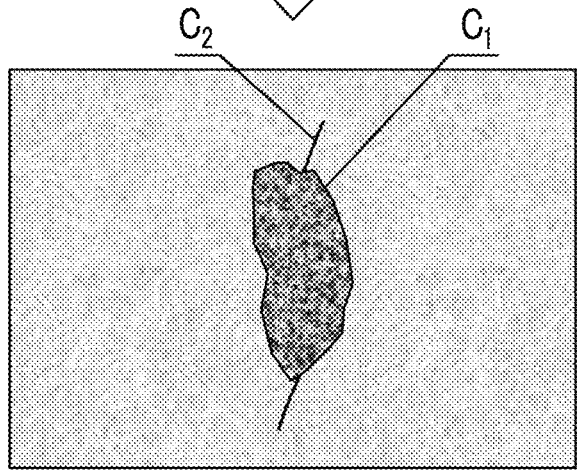
Figure 18C:
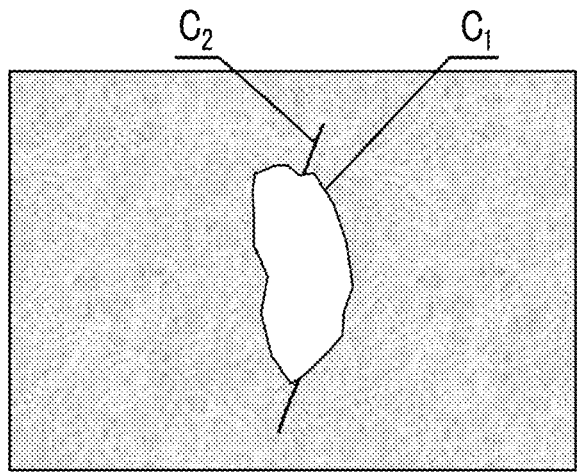

FIGS. 18A to 18C are schematic views showing an example of the damage detection results of planar free lime and linear free lime by the damage detection processing unit and output processing thereof.

FIG. 18A shows a case where the images 13 are input to the damage detection processing units 21 (trained models 21A and 21C) shown in FIG. 10, respectively, the damage region of planar free lime $C_1$ is detected by the trained model 21A, and the damage region of the linear free lime $C_2$ is detected by the trained model 21C. In this case, the CPU 20 determines whether or not these planar free lime $C_1$ and linear free lime $C_2$ are detected from the same or adjacent positions.

In the example shown in FIG. 18A, since the planar free lime $C_1$ and the linear free lime $C_2$ partially overlap with each other, the CPU 20 determines that the planar free lime $C_1$ and the linear free lime $C_2$ are detected from the same or adjacent positions. Then, in a case where the CPU 20 determines that the planar free lime $C_1$ and the linear free lime $C_2$ are detected from the same or adjacent positions, the CPU 20 outputs the damage detection result in accordance with the priority of the damage type.

In the example shown in FIGS. 18A to 18C, since the priority is set to be the planar free lime $C_1$ and the linear free lime $C_2$ in descending order of priority, as shown in FIG. 18B, for the overlapping part of the planar free lime $C_1$ and the linear free lime $C_2$, the CPU 20 prioritizes the planar free lime $C_1$ to cause the display unit 30 to display a damage image in which the damage region of the planar free lime $C_1$ is filled with a specific color, via the display control unit 26, and to cause the display unit 30 to display a damage image in which a part of the region of the linear free lime $C_2$ that does not overlap with the planar free lime $C_1$ is filled with color, via the display control unit 26. Further, as shown in FIG. 18C, for the overlapping part of the planar free lime $C_1$ and the linear free lime $C_2$, the CPU 20 outputs the CAD data of the polygon surrounding the damage region of the planar free lime $C_1$ and the CAD data of the polyline of a part of the linear free lime $C_2$ that does not overlap with the planar free lime $C_1$, as a file.

Figure 19A:
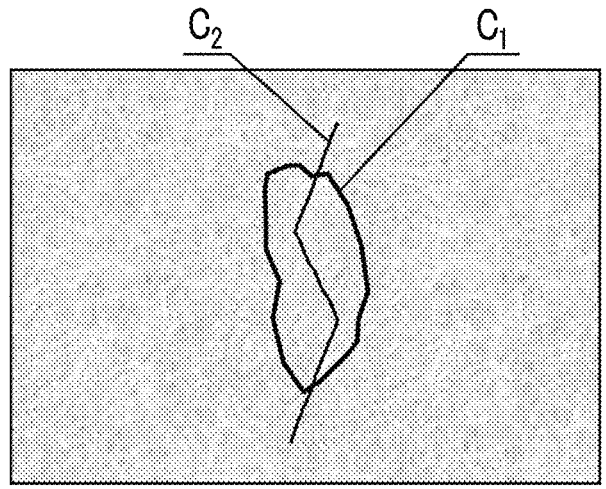
FIGS. 19A and 19B are schematic views showing another example of the damage detection results of planar free lime and linear free lime by the damage detection processing unit and the output processing thereof.
Figure 19B:
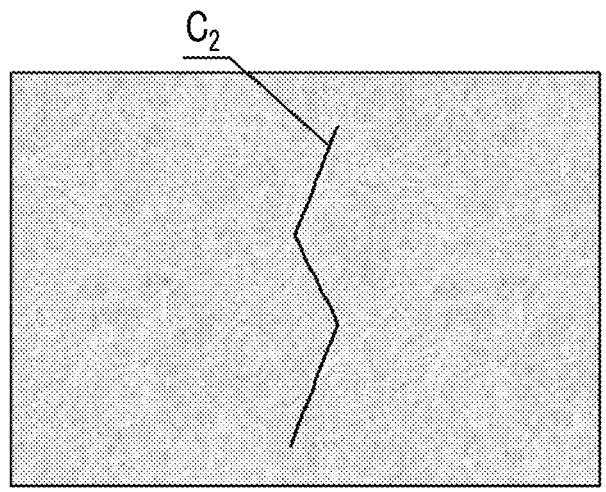

FIGS. 19A and 19B are schematic views showing another example of the damage detection results of planar free lime and linear free lime by the damage detection processing unit and the output processing thereof.

In the example shown in FIGS. 19A and 19B, the order of the priority of the planar free lime $C_1$ and the priority of the linear free lime $C_2$ is set to be reversed as compared with the example shown in FIGS. 18A to 18C, and the priority of the linear free lime $C_2$ is higher than the priority of the planar free lime $C_1$.

As shown in FIG. 19A, in a case where the planar free lime $C_1$ and the linear free lime $C_2$ partially overlap with each other, as shown in FIG. 19B, for the overlapping part of the planar free lime $C_1$ and the linear free lime $C_2$, the CPU 20 preferentially displays a damage image in which the region of the linear free lime $C_2$ is filled with color, and similarly, preferentially outputs the CAD data of the polyline of the linear free lime $C_2$ as a file. In this case, neither the damage image nor the CAD data is output for the planar free lime $C_1$.

Figure 20A:
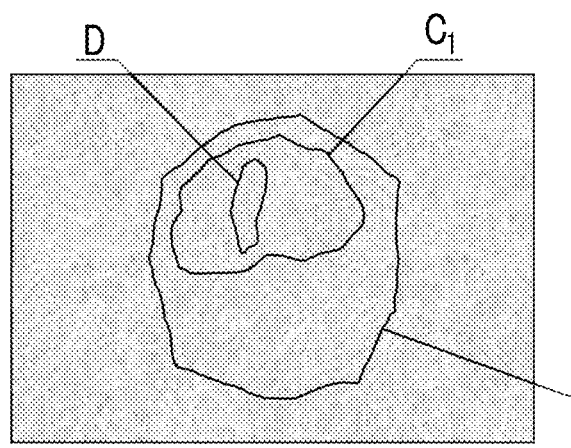
FIGS. 20A to 20C are schematic views showing an example of damage detection results of rust juice, planar free lime, and water leakage by the damage detection processing unit and output processing thereof.
Figure 20B:
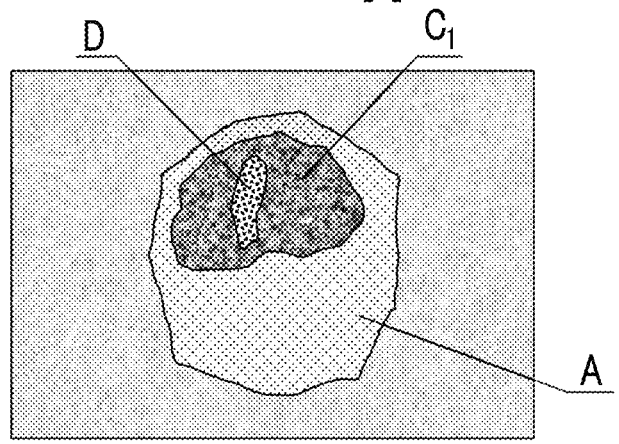
Figure 20C:
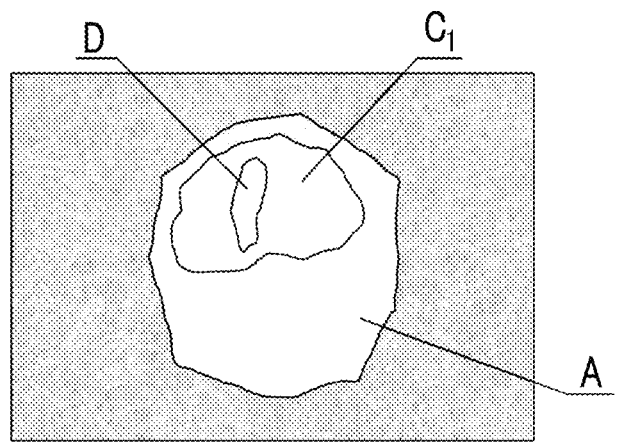

FIGS. 20A to 20C are schematic views showing an example of the damage detection results of rust juice, planar free lime, and water leakage by the damage detection processing unit and output processing thereof.

FIG. 20A shows a case where the image 13 is input to the damage detection processing unit 21 (trained model 21A) shown in FIG. 10, and the damage regions of rust juice D, planar free lime $C_1$, and water leakage A are detected by the trained model 21A. In this case, the CPU 20 determines whether or not these rust juice D, planar free lime $C_1$, and water leakage A are detected from the same or adjacent positions.

In the example shown in FIG. 20A, since the planar free lime $C_1$ occurs inside the region of water leakage A, and the rust juice D occurs inside the planar free lime $C_1$, all or part of the damage overlaps with each other, in these types of damage.

In the case of the rust juice D, the planar free lime $C_1$, and the water leakage A shown in FIG. 20A, the CPU 20 determines that these types of damage are detected from the same or adjacent positions. Then, in a case where the CPU 20 determines that the rust juice D, the planar free lime $C_1$, and the water leakage A are detected from the same or adjacent positions, the CPU 20 outputs the damage detection result in accordance with the priority of the damage type.

In the example shown in FIGS. 20A to 20C, since the priority is set to be the rust juice D, the planar free lime $C_1$, and the water leakage A in descending order of priority, as shown in FIG. 20B, the CPU 20 superimposes the region of the planar free lime $C_1$ on the region of the water leakage A, and further superimposes the region of the rust juice D on the region of the planar free lime $C_1$, to cause the display unit 30 to display a damage image in which each region is filled with color which is different for each damage type, via the display control unit 26. Further, as shown in FIG. 20C, the CPU 20 outputs the CAD data of the polygon surrounding each region of the rust juice D, the planar free lime $C_1$, and the water leakage A, as a file.

Figure 21A:
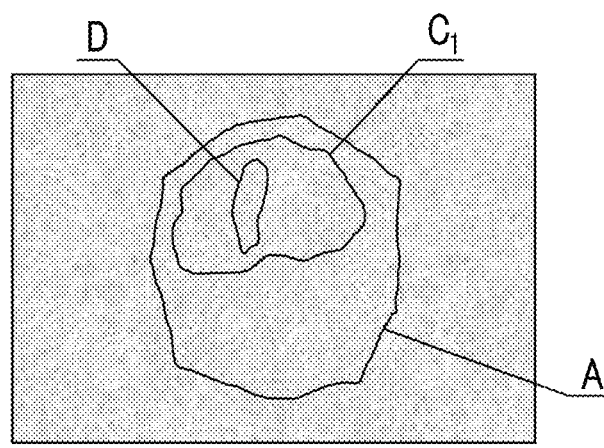
FIGS. 21A to 21C are schematic views showing another example of the damage detection results of rust juice, planar free lime, and water leakage by the damage detection processing unit and the output processing thereof.
Figure 21B:
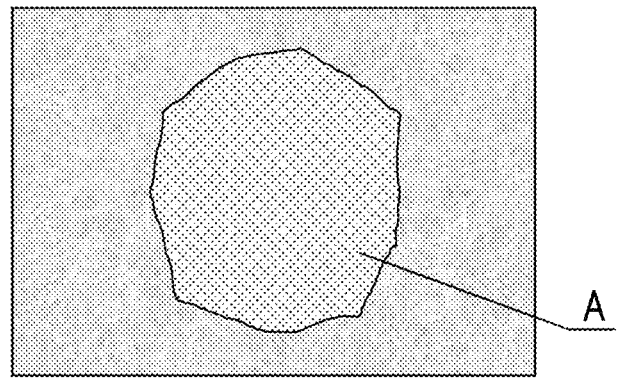
Figure 21C:
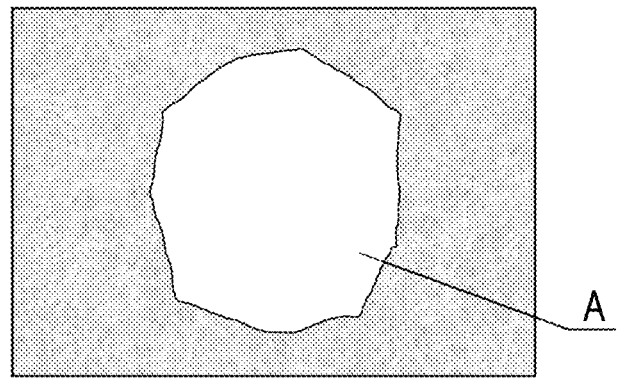

FIGS. 21A to 21C are schematic views showing another example of the damage detection results of rust juice, planar free lime, and water leakage by the damage detection processing unit and the output processing thereof.

In the example shown in FIGS. 21A to 21C, the order of the priorities of the rust juice D, the planar free lime $C_1$, and the water leakage A is set to be reversed as compared with the example shown in FIGS. 20A to 20C, and the priority is set to be the water leakage A, the planar free lime $C_1$, and the rust juice D in descending order of priority.

In a case where all or part of the rust juice D, the planar free lime $C_1$, and the water leakage A overlap with each other as shown in FIG. 21A, as shown in FIG. 21B, the CPU 20 preferentially displays a damage image in which the region of the water leakage A with the highest priority is filled with color. In this case, the damage images of the rust juice D and the planar free lime $C_1$ existing inside the region of the water leakage A are not displayed. Further, as shown in FIG. 21C, the CPU 20 preferentially outputs the CAD data of the polygon surrounding the region of the water leakage A with the highest priority, as a file. In this case, the CAD data of the polygons surrounding the rust juice D and the planar free lime $C_1$ existing inside the region of the water leakage A is not output.

The priority of the damage type is not limited to the above example, but it is preferable to set the priority according to the degree of severity of the damage (damage type in which the damage is more advanced). For example, in a case where the damage type is linear damage including linear free lime and cracking, the linear free lime is set to have a higher priority than the cracking. Further, in a case where the damage type is planar damage including reinforcing bar exposure, peeling, rust juice, planar free lime, and water leakage, the priority is set to be the reinforcing bar exposure, the peeling, the rust juice, the planar free lime, and the water leakage in descending order of priority.

Further, the priority of the damage type may be appropriately set by the user by using the operation unit 18. In this case, the CPU 20 can perform priority reception processing of receiving the priority of the damage type of the structure from the operation unit 18 that is operated by the user, save the received priority in the storage unit 16 or the like, and read out and use the priority from the storage unit 16 as necessary.

Second Embodiment of Damage Detection Result Output

Figure 22:
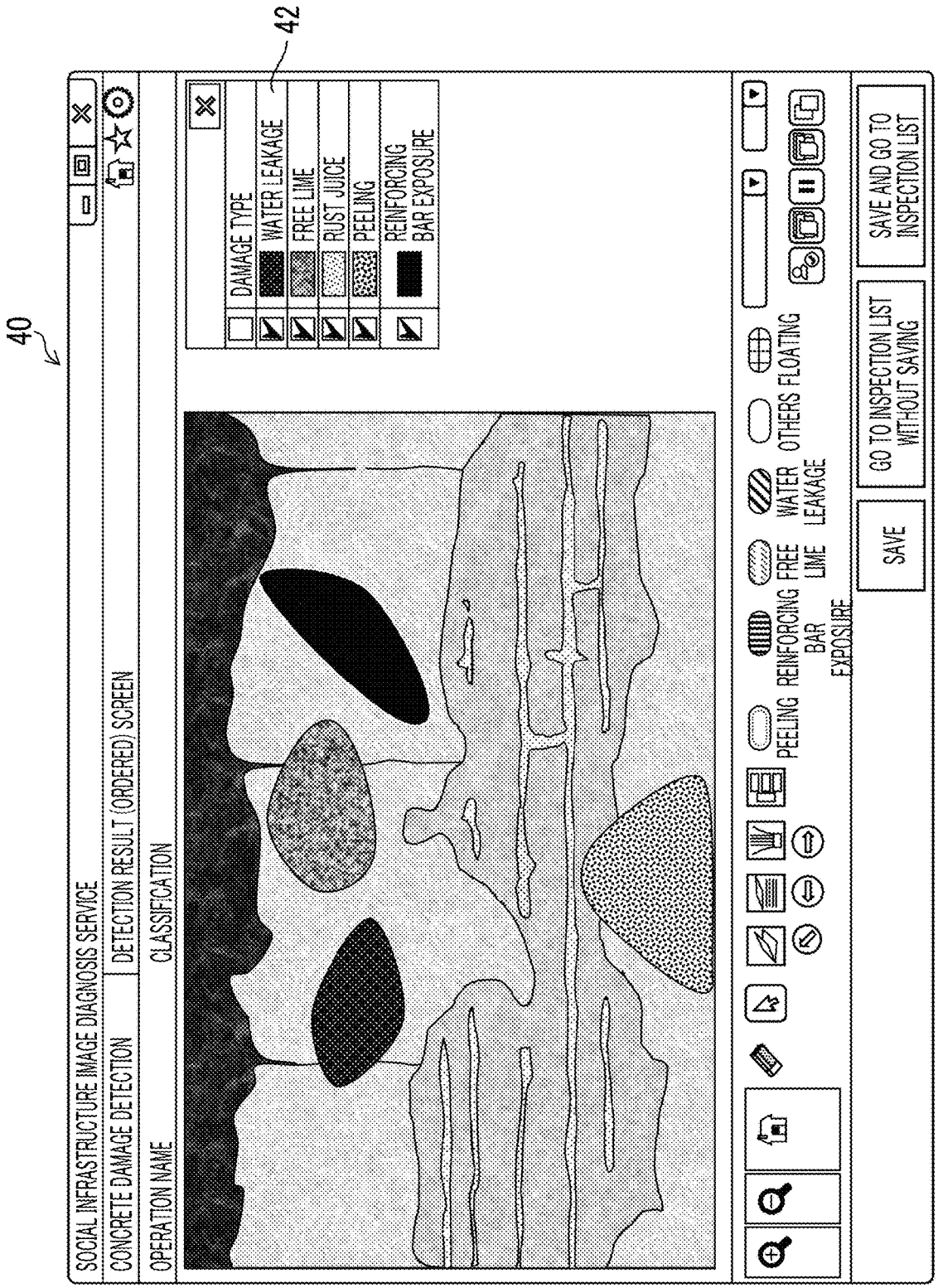
FIG. 22 is an image view showing a GUI showing a second embodiment of a damage detection result output, and is a view showing an example of a screen displayed on a display unit.
Figure 23:
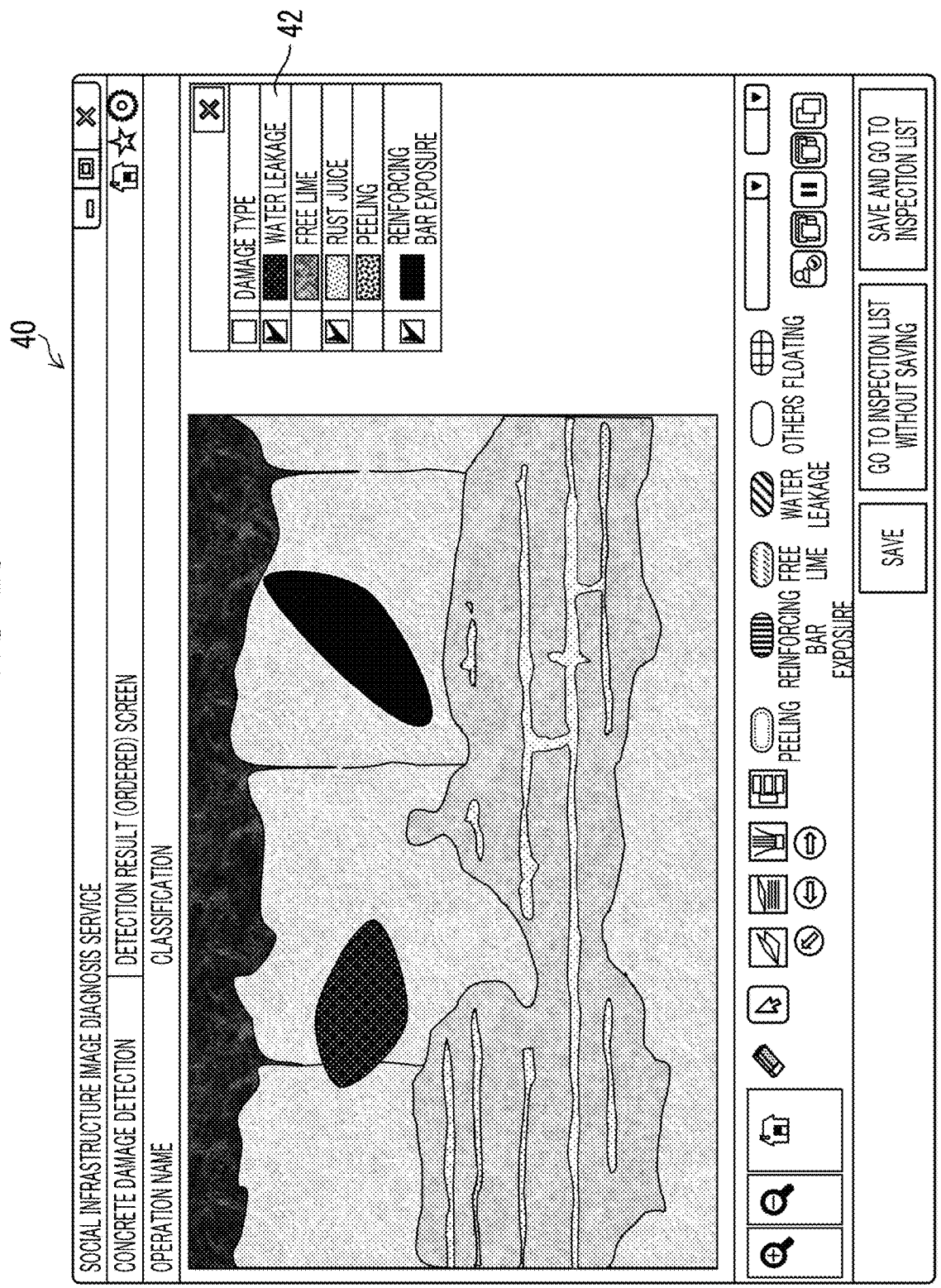
FIG. 23 is an image view showing the GUI showing the second embodiment of the damage detection result output, and is a view showing another example of the screen displayed on the display unit.

FIGS. 22 and 23 are each an image view of a graphical user interface (GUI) showing a second embodiment of a damage detection result output.

FIG. 22 is a view showing an example of a screen 40 displayed on the display unit 30.

A composite image in which the damage image is superimposed on the image obtained by imaging the structure, a check box 42 that is used to select the damage type to be displayed, and various icon buttons used for editing and the like are displayed on this screen 40. The damage detection result for each damage type detected by the damage detection processing unit 21 on the basis of the image obtained by imaging the structure can be held as CAD data of the layer structure indicating the damage region for each damage type.

In the example shown in FIG. 22, in the check box 42, since all five damage types, that is, water leakage, free lime, rust juice, peeling, and reinforcing bar exposure, are checked (five damage types are selected), the damage images of the above five damage types are superimposed and displayed on the image of the structure displayed on the screen 40.

Here, the damage image corresponding to the damage type can be created by filling the damage region with a color corresponding to the damage type on the basis of the CAD data of the layer corresponding to the damage type. As the color corresponding to the damage type, a color set in advance according to the damage type or a color set by the user can be used.

FIG. 23 is a view showing another example of the screen 40 displayed on the display unit 30.

In the example shown in FIG. 23, the damage image displayed on the screen 40 is different from the example shown in FIG. 22.

In the screen 40 shown in FIG. 23, in the check box 42, since three damage types, that is, water leakage, rust juice, and reinforcing bar exposure, are checked, the damage images of the above three damage types are superimposed and displayed on the image of the structure displayed on the screen 40.

Therefore, the screen 40 shown in FIG. 23 is different from the screen 40 shown in FIG. 22 in that the damage images corresponding to the free lime and the peeling are erased.

According to the second embodiment of the above damage detection result output, the user can select one or a plurality of desired damage types to display the damage image showing the damage of the selected damage type. It is preferable that the check box 42 displays only one or a plurality of damage types detected from the image. Further, the method of displaying the damage region for each damage type is not limited to the embodiments shown in FIGS. 22 and 23.

Third Embodiment of Damage Detection Result Output

FIGS. 24A to 26B are each an image view of a GUI showing a third embodiment of a damage detection result output.

Figure 24A:
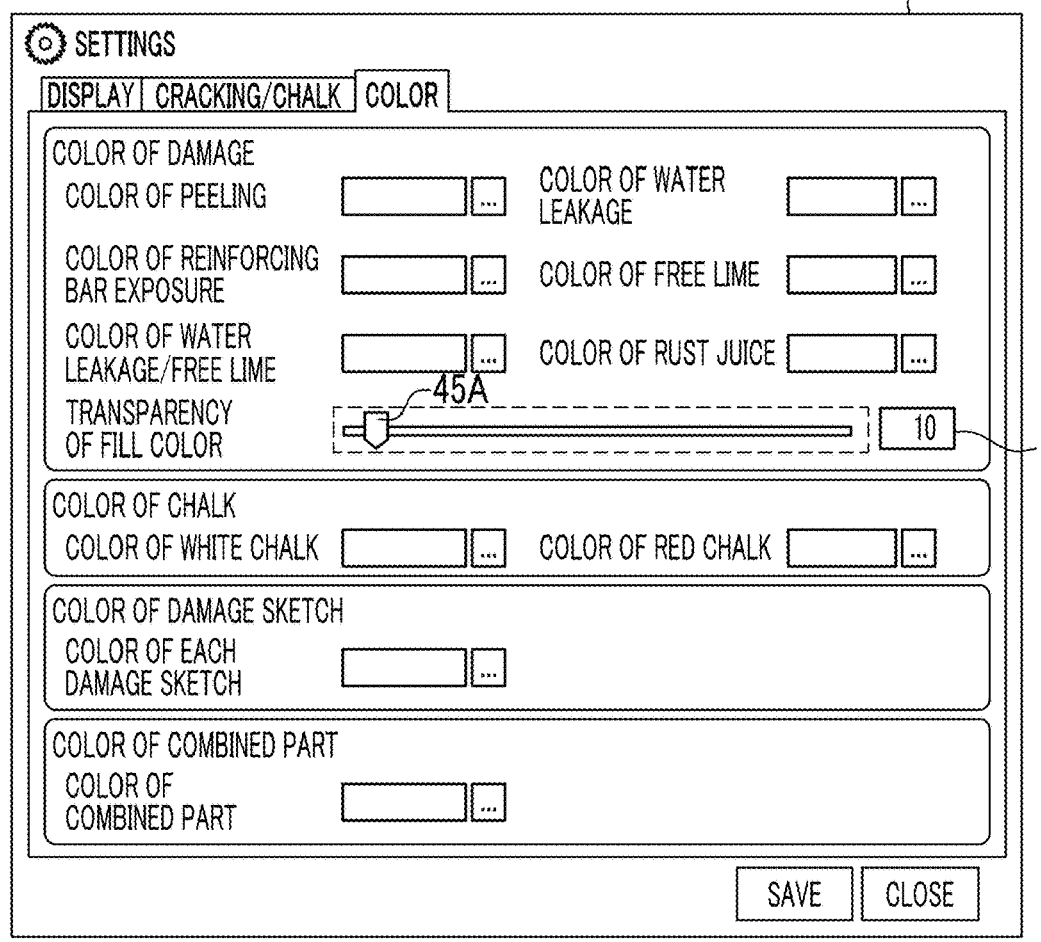

FIG. 24A is a view showing an example of a setting screen 44 for making various settings.

In the setting screen 44 shown in FIG. 24A, a "tab" for setting a color of damage and the like is selected, and the user can set the color of the damage image corresponding to the damage type shown in FIG. 22 and the like by using this setting screen.

Further, in the setting screen 44 shown in FIG. 24A, a slider 45A that is used in a case where the transparency of the color (fill color) of the damage image is set and a dialog box 45B for displaying the transparency are provided.

In the example shown in FIG. 24A, "10" is set as the transparency of the fill color of the damage image. In this example, the transparency in the case of opacity is "0", and the transparency in the case of complete transparency is "100".

Figure 24B:
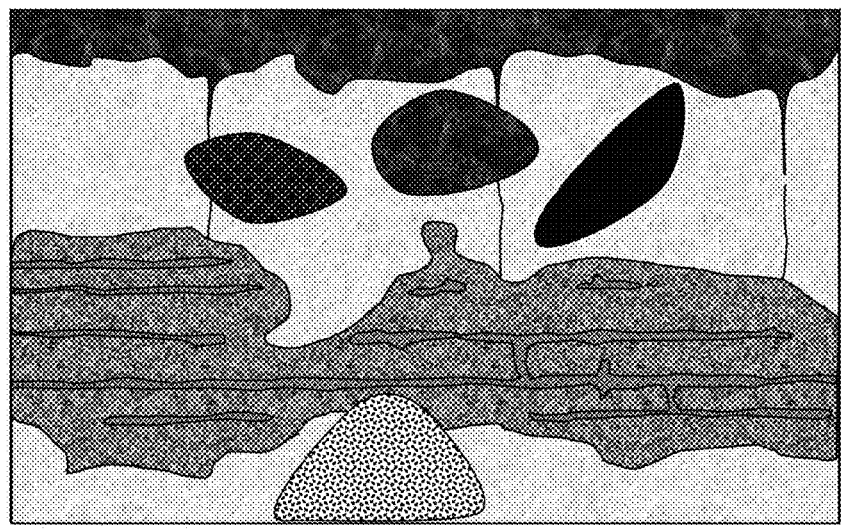

FIG. 24B is a view showing a composite image in which a damage image having a transparency of "10" is superimposed and displayed on the image obtained by imaging the structure.

The composite image shown in FIG. 24B can be displayed by closing the setting screen after the transparency "10" is set on the setting screen shown in FIG. 24A.

Figure 25A:
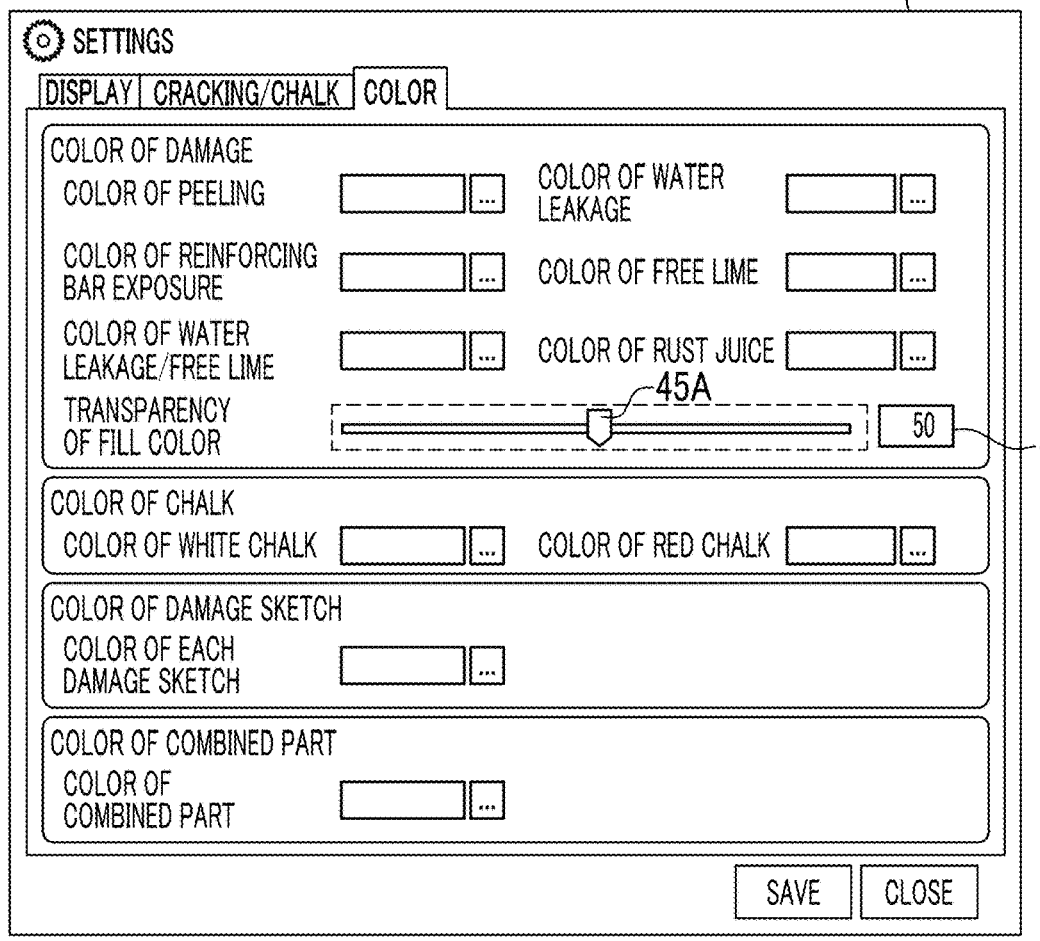
Figure 25B:
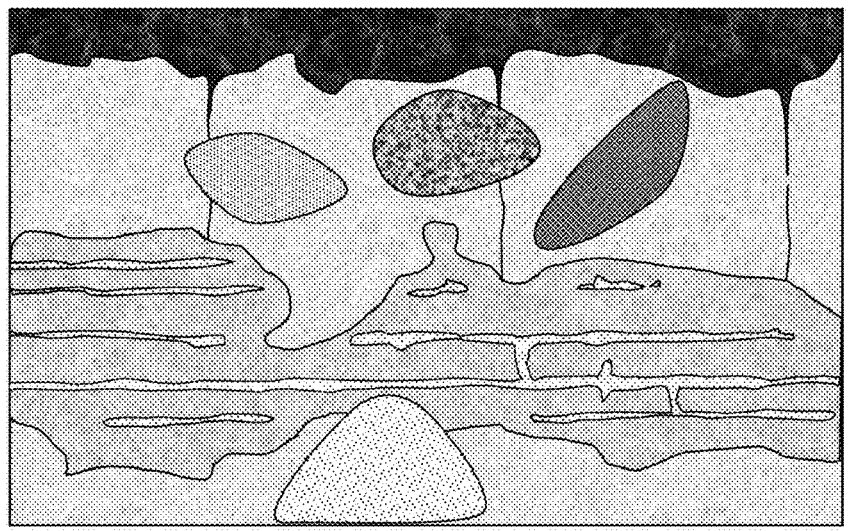

FIG. 25A shows a setting screen in which the transparency is set to "50", and FIG. 25B is a view showing a composite image in which a damage image having a transparency "50" is superimposed and displayed on the image obtained by imaging the structure.

Figure 26A:
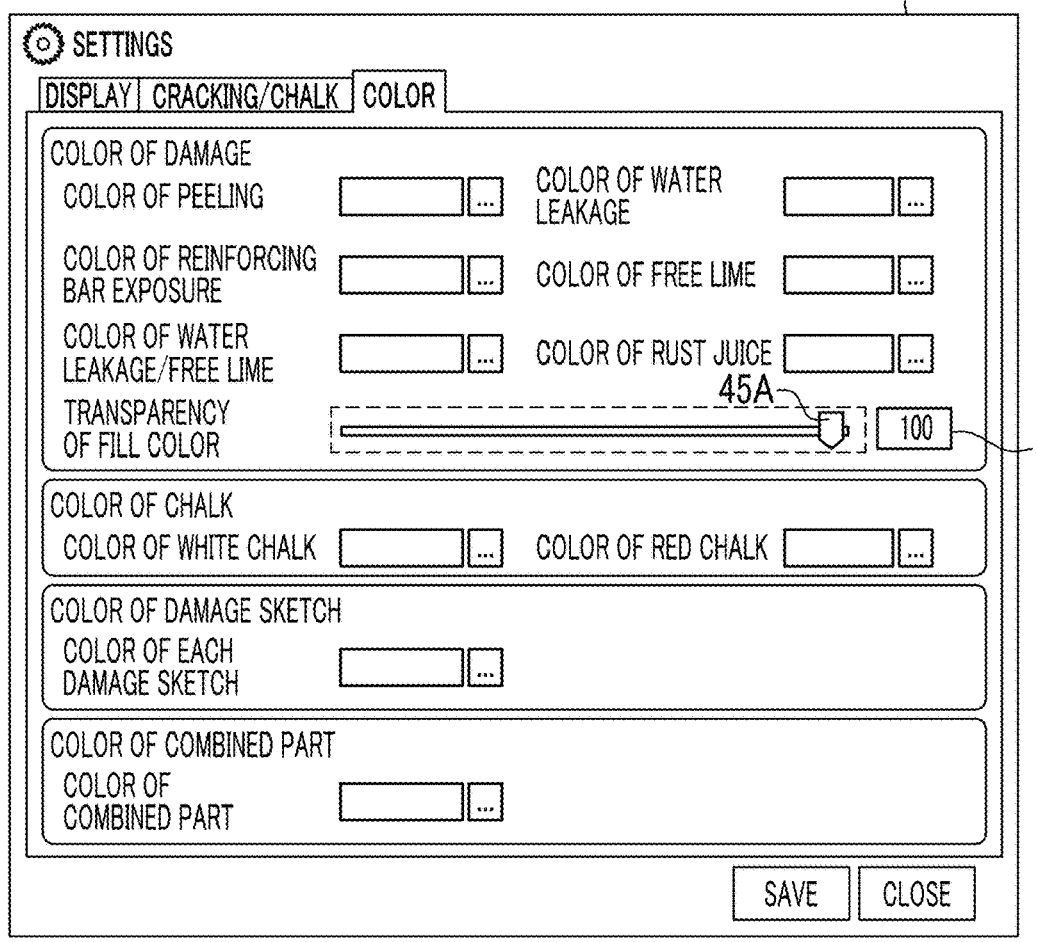
Figure 26B:
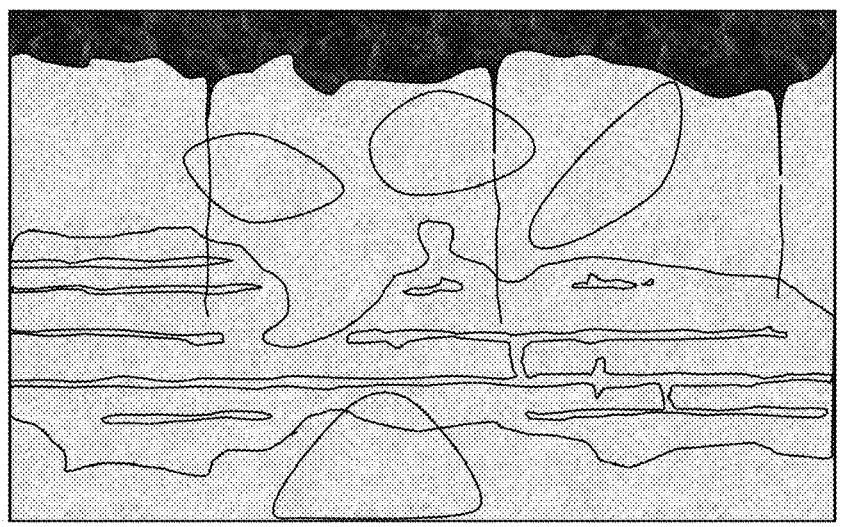

Further, FIG. 26A shows a setting screen in which the transparency is set to "100", and FIG. 26B is a view showing a composite image in which a damage image having a transparency "100" is superimposed and displayed on the image obtained by imaging the structure.

In FIG. 26B, since the transparency of the fill color is "100", the fill color is completely transparent, but the closed polygon surrounding the damage region for each damage type is displayed in a color set according to the damage type.

The transparency of the color with which the damage image is filled is set in this way and the damage image is displayed, so that the user can visually recognize the image (damage) of the structure covered by the damage image.

The second and third embodiments of the damage detection result output can be used in combination.

[Editing of Damage Detection Result]

The damage detection processing unit 21 shown in FIG. 10 outputs the damage type and the damage region for each damage type as the damage detection result in response to an input of the image 13 obtained by imaging the structure, but the damage detection result may be erroneously or inaccurately detected.

For example, the damage region may be inaccurate because the damage region is classified into regions in a pixel unit or in a unit of a group of some pixels. Further, it may be better to connect cracking detected as two cracking, into one cracking. This is because it may be possible to infer that cracking is connected inside the concrete.

In that respect, the CPU 20 performs editing instruction reception processing of receiving an editing instruction for the damage detection result through an operation on the operation unit 18 (for example, a mouse) that is operated by the user, and performs editing processing of editing the damage detection result in accordance with the received editing instruction.

In a case where the damage type is the same type of linear damage and is linear damage in which the endpoints of the polylines are close to each other, editing to connect the endpoints to each other can be considered as an example of editing the damage detection result. As the editing in this case, the distance between the endpoints of the polylines of the same type of linear damage may be measured after the damage detection processing, and the endpoints may be automatically connected to each other or automatically connected to each other in response to the user's instruction, in a case where the measured distance is a threshold value or less. As the threshold value, a default value may be used or it may be configured that a user can set the threshold value.

Further, a threshold value for the length or width of the linear damage and a threshold value for the area of the planar damage may be provided, and a damage detection result with a value smaller than the threshold value may be automatically deleted. In the deletion, the damage detection result may be automatically deleted after the damage detection processing, or may be deleted in response to the user's instruction. As the threshold value, a default value may be used or it may be configured that a user can set the threshold value.

FIGS. 27A to 28B are each a view showing an example of editing the damage detection result. In a case where editing of the damage detection result is performed, as shown in the third embodiment of the damage detection result output, it is preferable to set the transparency of the color with which the damage image is filled to be high, and to make the image of the structure easily recognizable visually.

Figure 27A:
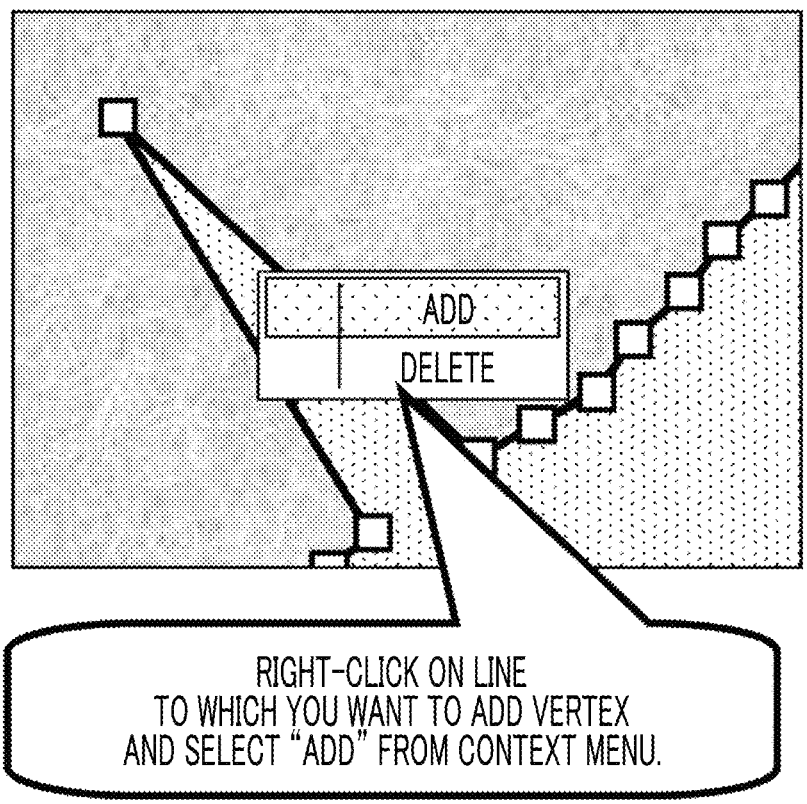
FIGS. 27A and 27B are views showing a method of adding a vertex to a polygon surrounding a damage region.
Figure 27A:
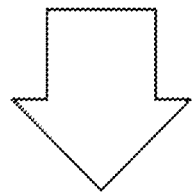
Figure 27B:
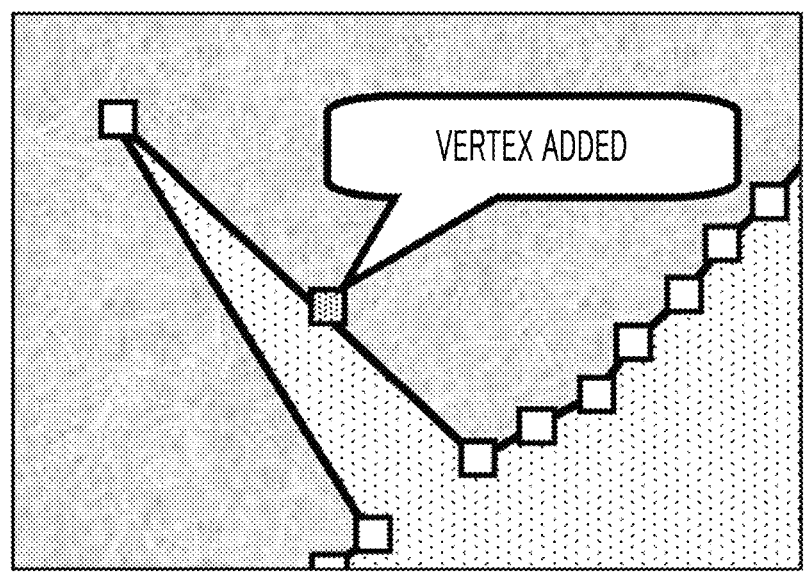

FIGS. 27A and 27B are views showing a method of adding a vertex to the polygon surrounding the damage region.

The polygon is drawn by connecting a plurality of vertices (vertices shown by squares in FIGS. 27A and 27B) along the damage region.

In a case where a vertex is added to this polygon, the user places the cursor of the mouse on the line of the polygon to which the user wants to add the vertex, right-clicks the mouse, and selects "Add" from the context menu, as shown in FIG. 27A. With this, it is possible to add a new vertex on the line of the polygon as shown in FIG. 27B.

Then, the user can edit the polygon surrounding the damage region by dragging the added vertex and by moving the vertex to the edge of the original damage region.

Figure 28A:
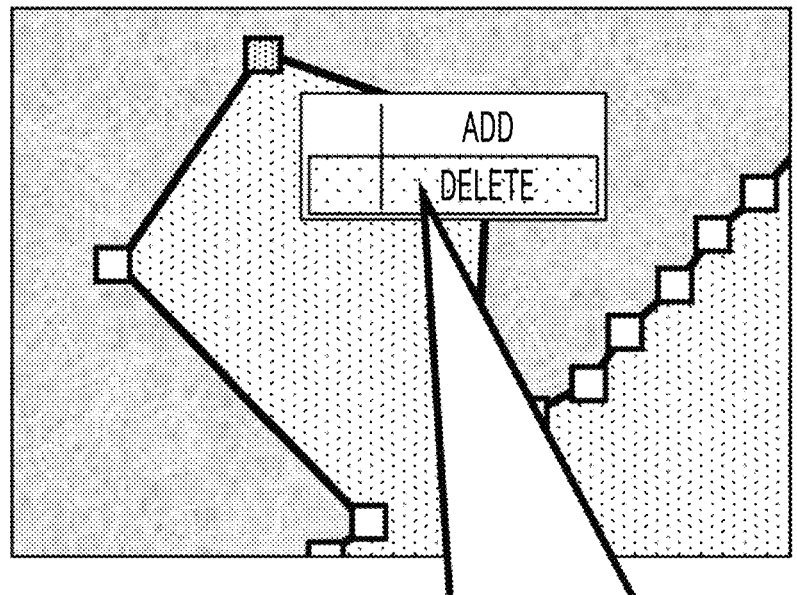
FIGS. 28A and 28B are views showing a method of deleting a vertex from a polygon surrounding a damage region.
Figure 28B:
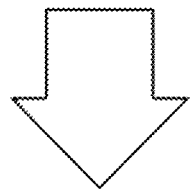
Figure 28B:
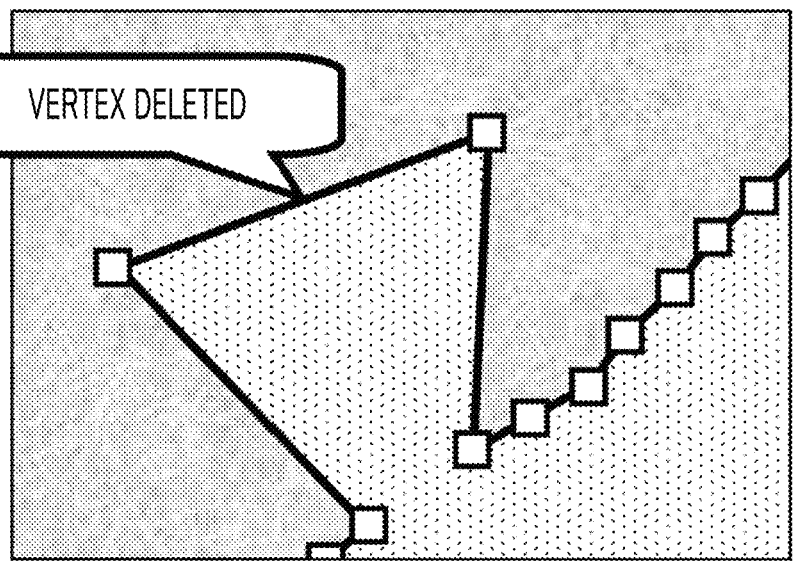

FIGS. 28A and 28B are views showing a method of deleting a vertex from the polygon surrounding the damage region.

In a case where a vertex is deleted from this polygon, the user places the cursor of the mouse on the vertex that the user wants to delete, right-clicks the mouse (makes the vertex selected), and selects "Delete" from the context menu, as shown in FIG. 28A. With this, the vertex can be deleted from the polygon as shown in FIG. 28B.

In a case where the vertex is deleted from the polygon as shown in FIG. 28B, the line of the polygon is connected between the vertices before and after the deleted vertex, whereby the polygon surrounding the damage region is edited.

In the above example of editing, editing such as addition or deletion of the vertex in the polygon of planar damage has been described, but editing such as addition or deletion of the vertex in the polyline of linear damage can also be performed in the same manner.

In addition, examples of the editing function include a function of deleting the entire polyline or polygon at once by selecting the entire polyline or polygon by, for example, clicking the line connecting the vertices or a function of manually adding a new polyline or polygon with respect to a missing part of damage detection.

[Inspection Support Method]

Figure 29:
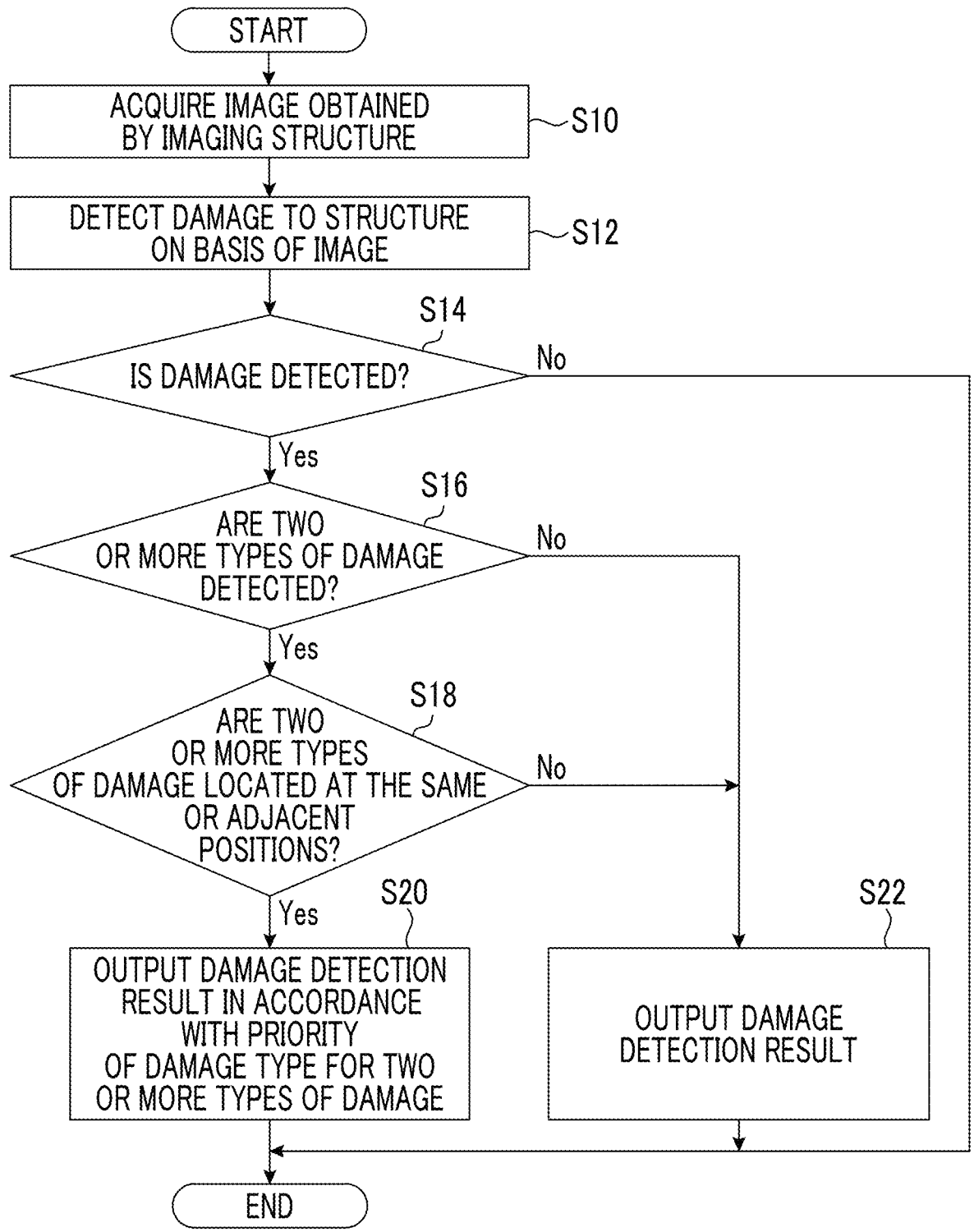
FIG. 29 is a flowchart showing an embodiment of an inspection support method according to the present invention.

FIG. 29 is a flowchart showing an embodiment of an inspection support method according to the present invention.

The processing of each step shown in FIG. 29 is performed by, for example, the processor composed of the CPU 20 and the like of the inspection support device 10 shown in FIG. 9.

In FIG. 29, the processor acquires an image obtained by imaging the structure to be inspected, from the image acquisition unit 12, the image database 14, or the like (step S10).

The damage detection processing unit 21 (FIG. 10) detects damage to the structure on the basis of the image acquired in step S10 (step S12).

The processor discriminates whether or not damage is detected by the damage detection performed in step S12 (step S14), and the processor discriminates, in a case where damage is detected (in the case of "Yes"), whether or not two or more types of damage are detected (step S16).

In a case where the processor discriminates in step S16 that two or more types of damage are detected (in the case of "Yes"), the processor further determines whether or not two or more types of damage are detected from the same or adjacent positions among the two or more types of damage (step S18).

Then, in a case where the processor determines in step S18 that two or more types of damage are detected from the same or adjacent positions (in the case of "Yes"), the processor outputs the damage detection result in accordance with the priority of the damage type (step S20). The damage detection result is output, for example, by superimposing the damage image on the image, displaying the damage image alone on the display unit, or outputting the CAD data showing the damage diagram as a file.

On the other hand, in a case where two or more types of damage are not detected in step S16 (in the case of "No"), that is, in a case where only one type of damage is detected or a case where the processor determines in step S18 that two or more types of damage are not detected from the same or adjacent positions (in the case of "No"), the process proceeds to step S22, and in step S22, one or two or more types of damage detection results are output as they are.

[Others]

The hardware that realizes the inspection support device according to the present invention can be composed of various processors. The various processors include a central processing unit (CPU) which is a general-purpose processor that executes a program to function as various processing units, a programmable logic device (PLD) which is a processor whose circuit configuration can be changed after manufacture, such as a field programmable gate array (FPGA), and a dedicated electric circuit which is a processor that has a dedicated circuit configuration designed to execute specific processing, such as an application specific integrated circuit (ASIC). One processing unit constituting the inspection support device may be composed of one of the above various processors or two or more of the above various processors of the same type or different types. For example, one processing unit may be composed of a combination of a plurality of FPGAs or a combination of a CPU and an FPGA. Alternatively, a plurality of processing units may be composed of one processor. A first example of the configuration in which a plurality of processing units are composed of one processor includes an aspect in which one or more CPUs and software are combined to constitute one processor, and the processor functions as the plurality of processing units, as typified by a computer, such as a client or a server. A second example of the configuration includes an aspect in which a processor that realizes all the functions of a system including a plurality of processing units with one integrated circuit (IC) chip is used, as typified by a system on chip (SoC). As described above, the various processing units are composed of one or more of the above various processors, as a hardware structure. Further, as the hardware structure of these various processors, more specifically, electric circuits (circuitry) in which circuit elements, such as semiconductor elements, are combined are used.

Further, the present invention includes the inspection support program that is installed on a computer to cause the computer to function as the inspection support device according to the present invention, and a storage medium in which the inspection support program is stored.

Furthermore, the present invention is not limited to the above-described embodiment, and various modifications may be made without departing from the spirit of the present invention.

EXPLANATION OF REFERENCES

1: bridge
2: main girder
3: cross-beam
4: sway brace
5: lateral brace
6: floor slab
7: bridge pier
10: inspection support device
12: image acquisition unit
13: image
14: image database
16: storage unit
18: operation unit
20: CPU
21: damage detection processing unit
21A to 21C: trained model
22: RAM
24: ROM
26: display control unit
27A to 27C: damage detection result
30: display unit
40: screen
42: check box
44: setting screen
45A: slider
45B: dialog box
A: water leakage
B, C1 to C5: cracking
$C_1$: free lime (planar)
$C_2$: free lime (linear)
D: rust juice
E: peeling
F: reinforcing bar exposure
H1: peeling
L1 to L6: shortest distance
P1 to P6: point of interest
S10 to S22: step
X, Y: polyline

What is claimed is:

1. An inspection support device comprising:
a processor,
wherein the processor performs image acquisition processing of acquiring an image obtained by imaging a structure including a concrete member to be inspected, damage detection processing of detecting damage to the structure on the basis of the acquired image, determination processing of determining, in a case where two or more types of damage to the structure are detected by the damage detection processing, among the two or more types of damage, whether or not two or more types of damage are detected from a same position or adjacent positions, and output processing of outputting a damage detection result detected by the damage detection processing, the output processing being processing of outputting the damage detection result in accordance with a priority of a damage type in a case where determination is made by the determination processing that two or more types of damage are detected from the same or adjacent positions.

2. The inspection support device according to claim 1, wherein in the damage detection processing, a damage region and a damage type for each damage region are detected on the basis of the image, in the determination processing, it is determined whether or not two or more damage types are detected in the same or adjacent damage regions, and in the output processing, in a case where determination is made by the determination processing that two or more damage types are detected in the same or adjacent damage regions, a damage detection result of a damage type with a highest priority is output as a damage detection result of the same or adjacent damage regions.

3. The inspection support device according to claim 1, wherein the adjacent positions are positions where a distance between the two or more types of damage is a threshold value or less.

4. The inspection support device according to claim 2, wherein the adjacent positions are positions where a distance between the two or more types of damage is a threshold value or less.

5. The inspection support device according to claim 1, wherein the damage detection processing is executed by a trained model that outputs a damage region and a damage type for each damage region as a recognition result in response to an input of the image.

6. The inspection support device according to claim 2, wherein the damage detection processing is executed by a trained model that outputs a damage region and a damage type for each damage region as a recognition result in response to an input of the image.

7. The inspection support device according to claim 3, wherein the damage detection processing is executed by a trained model that outputs a damage region and a damage type for each damage region as a recognition result in response to an input of the image.

8. The inspection support device according to claim 1, wherein in the output processing, different drawing patterns are output depending on whether the damage type is linear damage or the damage type is planar damage.

9. The inspection support device according to claim 2, wherein in the output processing, different drawing patterns are output depending on whether the damage type is linear damage or the damage type is planar damage.

10. The inspection support device according to claim 8, wherein in the output processing, in a case where the damage type is linear damage, a damage diagram showing a non-closed line of the linear damage is output, and in a case where the damage type is planar damage, a damage diagram showing a closed line surrounding the planar damage is output.

11. The inspection support device according to claim 8, wherein in the output processing, in a case where the damage type is linear damage, a damage image in which at least the linear damage is filled with color is output, and in a case where the damage type is planar damage, a damage image in which at least the planar damage is filled with color is output.

12. The inspection support device according to claim 1, wherein in the output processing, the damage detection result is output and displayed on a display, or the damage detection result is saved as a file in a memory.

13. The inspection support device according to claim 1, wherein the priority of the damage type of the two or more damage types is set in advance according to a degree of severity indicated by each of the two or more damage types.

14. The inspection support device according to claim 13, wherein in a case where the damage type is linear damage including linear free lime and cracking, the linear free lime has a higher priority than the cracking.

15. The inspection support device according to claim 13, wherein in a case where the damage type is planar damage including reinforcing bar exposure, peeling, rust juice, planar free lime, and water leakage, the priority is set to be the reinforcing bar exposure, the peeling, the rust juice, the planar free lime, and the water leakage in descending order of priority.

16. The inspection support device according to claim 1, wherein the processor performs priority reception processing of receiving the priority of the damage type of the structure from an operation unit operated by a user, and the priority of the damage type is a priority received from the user via the operation unit.

17. The inspection support device according to claim 1, wherein the processor performs editing instruction reception processing of receiving an editing instruction for the damage detection result from an operation unit operated by a user, and editing processing of editing the damage detection result in accordance with the received editing instruction.

18. The inspection support device according to claim 1, wherein the damage detection result has items of damage identification information, the damage type, and a size, and includes a damage quantity table in which information corresponding to each item is described for each detected damage.

19. An inspection support method of performing inspection support for a structure including a concrete member to be inspected, by a processor, each processing of the processor comprising:

a step of acquiring an image obtained by imaging the structure to be inspected;

a step of detecting damage to the structure on the basis of the acquired image;

a step of determining, among two or more types of the detected damage to the structure, whether or not two or more types of damage are detected from a same position or adjacent positions; and a step of outputting a damage detection result in accordance with a priority of a damage type in a case where determination is made that two or more types of damage are detected from the same or adjacent positions.

20. A non-transitory computer recording medium storing an inspection support program that causes a computer to execute a method of performing inspection support for a structure including a concrete member to be inspected, the method comprising:
- a step of acquiring an image obtained by imaging the structure to be inspected;
- a step of detecting damage to the structure on the basis of the acquired image;
- a step of determining, among two or more types of the detected damage to the structure, whether or not two or more types of damage are detected from a same position or adjacent positions; and
- a step of outputting a damage detection result in accordance with a priority of a damage type in a case where determination is made that two or more types of damage are detected from the same or adjacent positions.

* * * * *